US012674343B2

(12) United States Patent
Okawa et al.

(10) Patent No.: US 12,674,343 B2
(45) Date of Patent: Jul. 7, 2026

(54) VEHICLE DOOR LATCH DEVICE

(71) Applicant: MITSUI KINZOKU ACT CORPORATION, Yokohama (JP)

(72) Inventors: Shintaro Okawa, Yokohama (JP); Keiichiro Okuyama, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 0 days.

(21) Appl. No.: 18/972,247

(22) Filed: Dec. 6, 2024

(65) Prior Publication Data

US 2025/0188774 A1 Jun. 12, 2025

(30) Foreign Application Priority Data

Dec. 8, 2023 (JP) ................................ 2023-207585

(51) Int. Cl.
*E05B 85/24* (2014.01)
*E05B 85/26* (2014.01)

(52) U.S. Cl.
CPC ............ *E05B 85/26* (2013.01); *E05B 85/243* (2013.01)

(58) Field of Classification Search
CPC ........ E05B 85/26; E05B 85/243; E05B 85/02; E05B 83/36; E05B 81/06; E05B 85/00; E05B 85/24; E05C 17/003; E05C 17/00
See application file for complete search history.

(56) References Cited

U.S. PATENT DOCUMENTS

| | | | | |
|---|---|---|---|---|
| 11,965,367 B2 * | 4/2024 | Okawa | .................... | E05B 77/34 |
| 2017/0074304 A1 * | 3/2017 | Bowers | ................. | F16B 5/0642 |

FOREIGN PATENT DOCUMENTS

| | | |
|---|---|---|
| JP | 2020105695 A | 7/2020 |
| JP | 2022000554 A | 1/2022 |

* cited by examiner

*Primary Examiner* — Kristina R Fulton
*Assistant Examiner* — Thomas L Neubauer
(74) *Attorney, Agent, or Firm* — NIXON & VANDERHYE

(57) ABSTRACT

A vehicle door latch device comprises a latch engaging with a striker on a vehicle body, a ratchet provided with a pawl which blocks the latch from pivoting by respectively engaging with a half-latched engagement portion and a fully-latched engagement portion of the latch, a holding lever blocking the pawl from pivoting in a releasing direction by abutting with the ratchet, and a third latch lever which engages with a third engagement portion provided on the latch when the latch is in a third latch position which is between a half-latched position and an open position to block the latch from pivoting from the third latch position, wherein a pivot shaft of the third latch lever is provided at a position close to a pivoting locus of the latch outside the pivoting locus.

4 Claims, 17 Drawing Sheets

VEHICLE DOOR LATCH DEVICE

CROSS-REFERENCE TO RELATED APPLICATIONS

This application claims benefit of the benefit of previously filed JP Application No. 2023-207585 which was filed on Dec. 8, 2023, which is incorporated herein by reference in its entirety.

FIELD OF THE INVENTION

The present invention relates to a vehicle door latch device, particularly relates to a vehicle door latch device which is relatively small and lightweight, and durable, and is capable of stopping a door in a door-half-open-state determinable position even though a pawl of a ratchet disengages from a latch in an unsteady engagement state.

BACKGROUND OF THE INVENTION

This section provides background information related to a vehicle door latch device and is not necessarily prior art to the vehicle door latch device of the present disclosure.

A conventional vehicle door latch device comprises a main body fixed to a door which is supported to a vehicle body to be capable of opening and closing,

- wherein the main body is provided with a latch which is capable of engaging with a striker on a vehicle body side when the door is closed, a first pawl which engages with the latch to block the latch from pivoting in an opening direction and to hold the engagement state between the latch and the striker, and a second pawl which engages with the first pawl to block the first pawl from pivoting in a direction for disengaging from the latch, and
- wherein when a door handle (an outside handle or an inside handle) provided on the door is operated to open, the second pawl is disengaged from the first pawl, the engagement between the first pawl and the latch is released, the door is pushed a little in an opening direction by a counterforce of a weatherstrip provided on the vehicle body side, the engagement between the striker and the latch is released, and thereby enabling the door to be operated to open.

However, in the case where the counterforce of the weatherstrip is extremely lowered by influence such as an aged deterioration, or in the case where the door is adhered to the weatherstrip owing to freezing of water entering into a gap between a periphery of the door and the weatherstrip during parking, even though the door handle is operated to open when the door is closed, the door is not pushed out by the counterforce of the weatherstrip and is kept in a closing position, and thus the vehicle door latch device is brought into a state in which the first pawl does not steadily engage with the latch until it reaches a regular position. In this state, that is, in an unsteady engagement state, it is extremely difficult to determine the state of the vehicle door latch device by watching its appearance because the door is almost the same condition as a fully-closed state in appearance.

Then, as a vehicle door latch device having a formation which makes it possible to easily determine whether an unsteady engagement state had occurred or not, JP 2022-000554 A proposes a vehicle door latch device comprising:

- a body fixed to a door;
- a latch which is pivotably supported to the body at a predetermined angle to pivot in a closing direction from an open position by engaging with a striker on a vehicle body side when the door is closed, and is capable of moving to a fully-latched position via a half-latched position;
- a ratchet pivotably supported to the body at a predetermined angle and provided with a pawl which blocks the latch from pivoting in an opening direction by respectively engaging with a half-latched engagement portion and a fully-latched engagement portion of the latch engaged with the striker, the ratchet corresponding to the above-described first pawl;
- a holding lever pivotably supported to the body at a predetermined angle to block the pawl from pivoting in a releasing direction to be released from the half-latched engagement portion or the fully-latched engagement portion by abutting with the ratchet when the pawl engages with the half-latched engagement portion or the fully-latched engagement portion, the holding lever corresponding to the above-described second pawl; and
- a third latch lever pivotably supported to the body at a predetermined angle to engage with a third engagement portion provided on the latch when the latch is in the third latch position between the half-latched position and the open position so that the third latch lever is capable of blocking the latch from pivoting in the opening direction from the third latch position.

In the device of JP 2022-000554 A, in the unsteady engagement state, when the pawl of the ratchet disengages from the latch, the third latch lever engages with the third engagement portion provided on the latch to block the latch from further pivoting in the opening direction from the third latch position and to stop the door in a door-half-open-state determinable position. Thus, an occupant can determine by watching an appearance of the door condition that the vehicle door latch device had been in the unsteady engagement state.

As a vehicle door lock device capable of preventing a pseudo latch state in which a pawl (corresponding to the above-described first pawl) restricts rotation of a latch at a rotation position before the pawl reaches a normal engagement position and a block lever (corresponding to the above-described second pawl) restricts rotation of the pawl at a rotation position before the block lever reaches a normal restriction position, JP 2020-105695 A proposes a vehicle door lock device comprising:

- a latch; a pawl; a block lever;
- a block lift lever which is connected to the block lever so as to rotate integrally with the block lever and has a first extension arm extending radially outward from a rotation center of the block lever, and
- a half latch lever which is provided with a support shaft in a vehicle exterior side from a pivoting locus of the latch and has an engagement protruding portion engaging with a half latch claw portion of the latch and a half latch arm extending in a direction facing the block lift lever, respectively on a vehicle interior end portion;
- wherein the first extension arm of the block lift lever and the half latch arm of the half latch lever are engaged with each other at their respective tip portions.

In the device of JP 2020-105695 A, in the pseudo latch state, when the pawl disengages from the latch, the latch engages with the half latch arm in an operation position at a half-latched position such that the rotation of the latch is restricted, and thereby capable of preventing the latch from pivoting in an opening direction from the half-latched position.

SUMMARY OF THE INVENTION

The present invention provides a vehicle door latch device which is relatively small and lightweight, and durable, and is capable of stopping a door in a door-half-open-state determinable position even though a pawl of a ratchet disengages from a latch in an unsteady engagement state. This device has a configulation that a pivot shaft of a third latch lever engaging with a third engagement portion provided on a latch when the latch is in a third latch position being between a half-latched position and an open position to block the latch from pivoting in an opening direction from the third latch position is provided at a position close to a pivoting locus of the latch outside the pivoting locus.

Thus, a vehicle door latch device according to the present invention comprises:

- a body fixed to a vehicle door;
- a latch which is pivotably supported to the body at a predetermined angle to pivot in a closing direction from an open position by engaging with a striker on a vehicle body side when the vehicle door is closed, and to be capable of moving to a fully-latched position via a half-latched position;
- a ratchet pivotably supported to the body at a predetermined angle and provided with a pawl which blocks the latch from pivoting in an opening direction by respectively engaging with a half-latched engagement portion and a fully-latched engagement portion of the latch engaged with the striker;
- a holding lever pivotably supported to the body at a predetermined angle to block the pawl from pivoting in a releasing direction to be released from the half-latched engagement portion or the fully-latched engagement portion by abutting with the ratchet when the pawl engages with the half-latched engagement portion or the fully-latched engagement portion; and
- a third latch lever pivotably supported to the body at a predetermined angle to engage with a third engagement portion provided on the latch when the latch is in a third latch position which is between the half-latched position and the open position so that the third latch lever is capable of blocking the latch from pivoting in the opening direction from the third latch position;
- wherein the latch, the ratchet, the holding lever, and the third latch lever are provided on the same plane on the body, and a pivot shaft of the third latch lever is provided at a position close to a pivoting locus of the latch outside the pivoting locus.

According to the present invention, in a vehicle door latch device comprising a third latch lever which engages with a third engagement portion provided on a latch when the latch is in a third latch position which is between a half-latched position and an open position to block the latch from pivoting in an opening direction from the third latch position, since a pivot shaft of the third latch lever is provided at a position close to a pivoting locus of the latch outside the pivoting locus, it is possible to obtain a vehicle door latch device which has a third latch lever being relatively small and lightweight and having a high strength, is relatively small and lightweight, and durable, and is capable of stopping a door in a door-half-open-state determinable position even though a pawl of a ratchet disengages from the latch in an unsteady engagement state so that an occupant can determine by watching an appearance of a door condition that the vehicle door latch device had been in the unsteady engagement state in the vehicle door latch device.

EMBODIMENTS OF THE INVENTION

Figure 1:
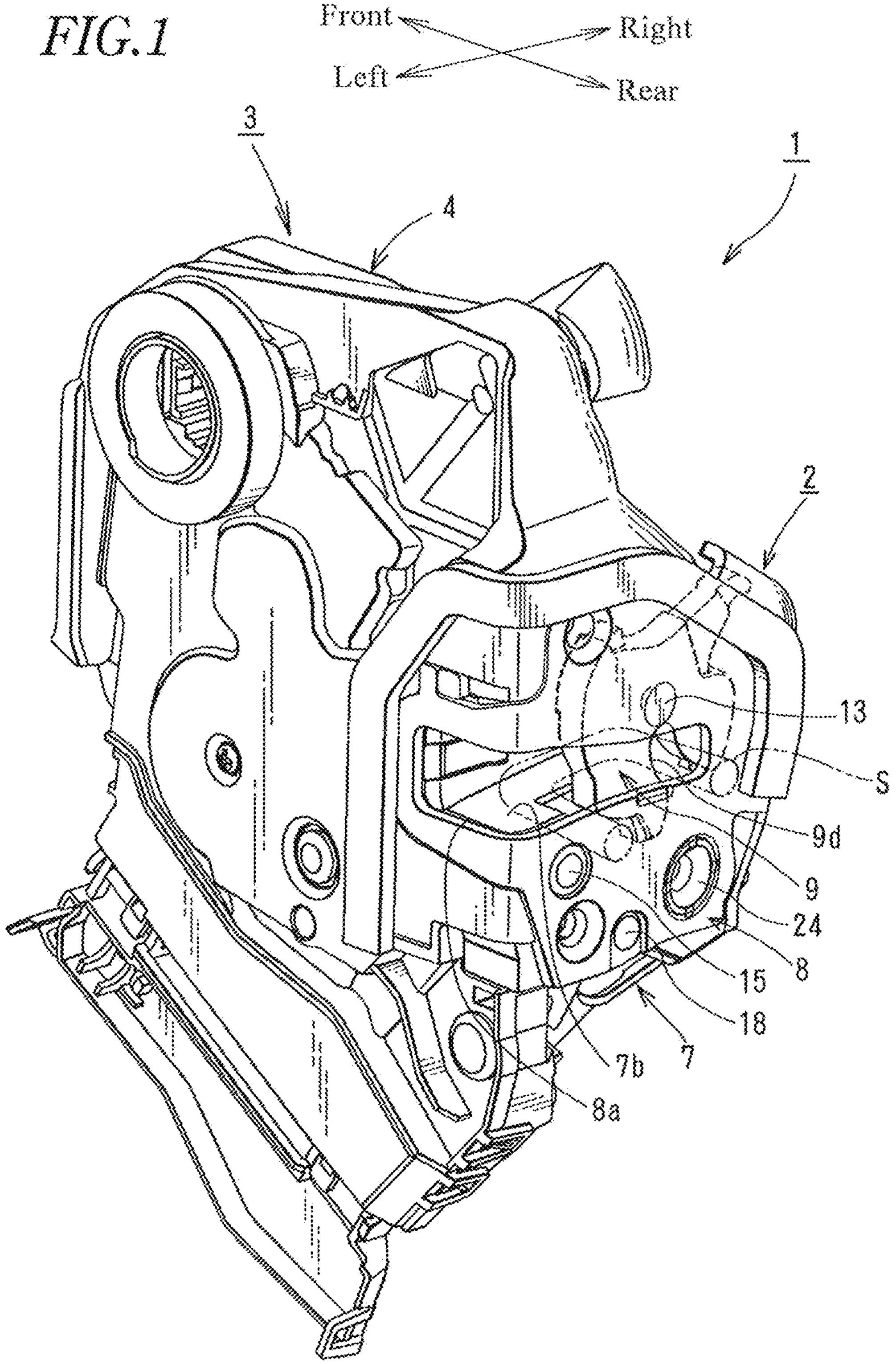
FIG. 1 is a perspective view showing a vehicle door latch device according to an embodiment of the present invention.

A vehicle door latch device according to the present invention comprises:

a body fixed to a vehicle door;

a latch which is pivotably supported to the body at a predetermined angle to pivot in a closing direction from an open position by engaging with a striker on a vehicle body side when the vehicle door is closed, and to be capable of moving to a fully-latched position via a half-latched position;

a ratchet pivotably supported to the body at a predetermined angle and provided with a pawl which blocks the latch from pivoting in an opening direction by respectively engaging with a half-latched engagement portion and a fully-latched engagement portion of the latch engaged with the striker;

a holding lever pivotably supported to the body at a predetermined angle to block the pawl from pivoting in a releasing direction to be released from the half-latched engagement portion or the fully-latched engagement portion by abutting with the ratchet when the pawl engages with the half-latched engagement portion or the fully-latched engagement portion; and a third latch lever pivotably supported to the body at a predetermined angle to engage with a third engagement portion provided on the latch when the latch is in a third latch position which is between the half-latched position and the open position so that the third latch lever is capable of blocking the latch from pivoting in the opening direction from the third latch position;

wherein the latch, the ratchet, the holding lever, and the third latch lever are provided on the same plane on the body, and a pivot shaft of the third latch lever is provided at a position close to a pivoting locus of the latch outside the pivoting locus.

In a first preferred example of the present invention, an axis center of the third latch lever is arranged on a side of the third engagement portion of the latch with respect to a vertical line passing through an axis center of the latch and is arranged on an opposite side of an axis center of the holding lever with respect to the vertical line passing through the axis center of the latch, and the third latch lever engages with the third engagement portion of the latch in a lower side of a horizontal line passing through the axis center of the latch.

In a second preferred example of the present invention, a ratio d/r of a distance d from an axis center of the latch to an axis center of the third latch lever to a radius r of an outermost circular arc of the pivoting locus of the latch is in a range of more than 1 and equal to or less than 1.3. This ratio is preferably in a range of equal to or more than 1.05 and equal to or less than 1.25.

In a third preferred example of the present invention, the pivot shaft of the third latch lever is provided at a position close to a pivot shaft of the holding lever.

In a fourth preferred example of the present invention, the third latch lever has a pawl portion capable of engaging with the third engagement portion of the latch and is biased towards a standby position where the pawl portion enters into a moving locus of the third engagement portion by a biasing force of a biasing member.

In the above-described fourth example, it is preferable that the third latch lever moves against the biasing force of the biasing member based on a releasing operation of a door-release-operation lever from the standby position to a retreating position where the pawl portion retreats outside the moving locus of the third engagement portion.

In the above-described fourth example, it is preferable that the vehicle door latch device further comprises a biasing lever pivotably supported to the body at a predetermined angle to be coupled with the third latch lever via a pivot shaft such that the biasing lever biases the third latch lever in a direction to engage with the third engagement portion by the biasing force of the biasing member, and a release transmission lever pivotably supported to the body at a predetermined angle to be capable of abutting with the biasing lever such that the release transmission lever pivots based on the releasing operation of the door-release-operation lever and makes the biasing lever pivot in a retreating direction against the biasing force of the biasing member to make the third latch lever pivot in the retreating direction, wherein the biasing lever and the release transmission lever are arranged on a plane on the body opposite to the plane where the latch, the ratchet, the holding lever, and the third latch lever are arranged. Thus, the number of levers arranged on an engagement surface of the latch can be minimized as the ratchet, the pawl, the holding lever, and the third latch lever, thereby capable of forming the engagement surface in a small size. Since the third latch lever is arranged on the same plane as the latch, there is no need to offset the engagement portion (the pawl portion) of the third latch lever with respect to the latch, and thereby capable of increasing a strength of the third latch lever.

In the above-described fourth example, it is more preferable that the release transmission lever is further capable of abutting with the ratchet and the holding lever, and pivots based on the releasing operation of the door-release-operation lever such that the release transmission lever makes the holding lever pivot in an allowed direction for allowing the ratchet to pivot in a releasing direction from a blocking position for blocking the ratchet from pivoting in the releasing direction, and makes the ratchet pivot in the releasing direction from an engagement position where the ratchet engages with the half-latched engagement portion or the fully-latched engagement portion of the latch. It is still more preferable that the release transmission lever moves the ratchet in the releasing direction from the engagement position after the release transmission lever moves the holding lever in the allowed direction from the blocking position.

In the above-described fourth example, it is preferable that each of the biasing lever and the release transmission lever is pivotably supported to the body at a predetermined angle by a common shaft.

In a fifth preferred example of the present invention, the pivot shaft of the third latch lever consists of a supporting member inserted into a hole which is formed on the body to insert a fastening member for fastening the vehicle door latch device to the vehicle door, and the supporting member has a function as a pivot shaft for the third latch lever and a function for fastening the vehicle door latch device to the vehicle door. Therefore, it is not necessary to provide a shaft separately to support the third latch lever, and thus it is not necessary to enlarge the door latch device even though the third latch lever is provided.

In the above-described fifth example, it is preferable that the supporting member is a tubular member having an enlarged head portion, a hollow portion of the supporting member is formed with a screw thread fitting onto a screw thread of the fastening member, and the vehicle door latch device is fastened to a door panel by fixing the fastening member to the hollow portion of the supporting member inserted into the hole formed on the body via the door panel. Therefore, a head portion of the fastening member is fitted to a tapered recessed portion of the head portion of the supporting member to be fastened rigidly, thereby capable of increasing a strength of the shaft portion fastening the door latch device to the door panel.

In a sixth preferred example of the present invention, a plate thickness $T_1$ of the third latch lever is smaller than a plate thickness $T_2$ of the latch. Accordingly, it is possible to ensure a necessary strength of the third latch lever and reduce its weight.

In a seventh preferred example of the present invention, the body has a housing part on which the latch, the ratchet, the holding lever, and the third latch lever are arranged; a cover plate for closing the housing part of the body is provided; the latch, the ratchet, the holding lever, and the third latch lever are housed between the body and the cover plate; and a raised portion close to the cover plate is provided on a surface facing the cover plate on the third latch lever. Accordingly, even if torsion occurs in the levers due to collision or the like, the raised portion abuts with the cover plate such that it is capable of reducing the torsion of the third latch lever to prevent the third latch lever from disengaging from the biasing lever and/or the latch.

Figure 2:
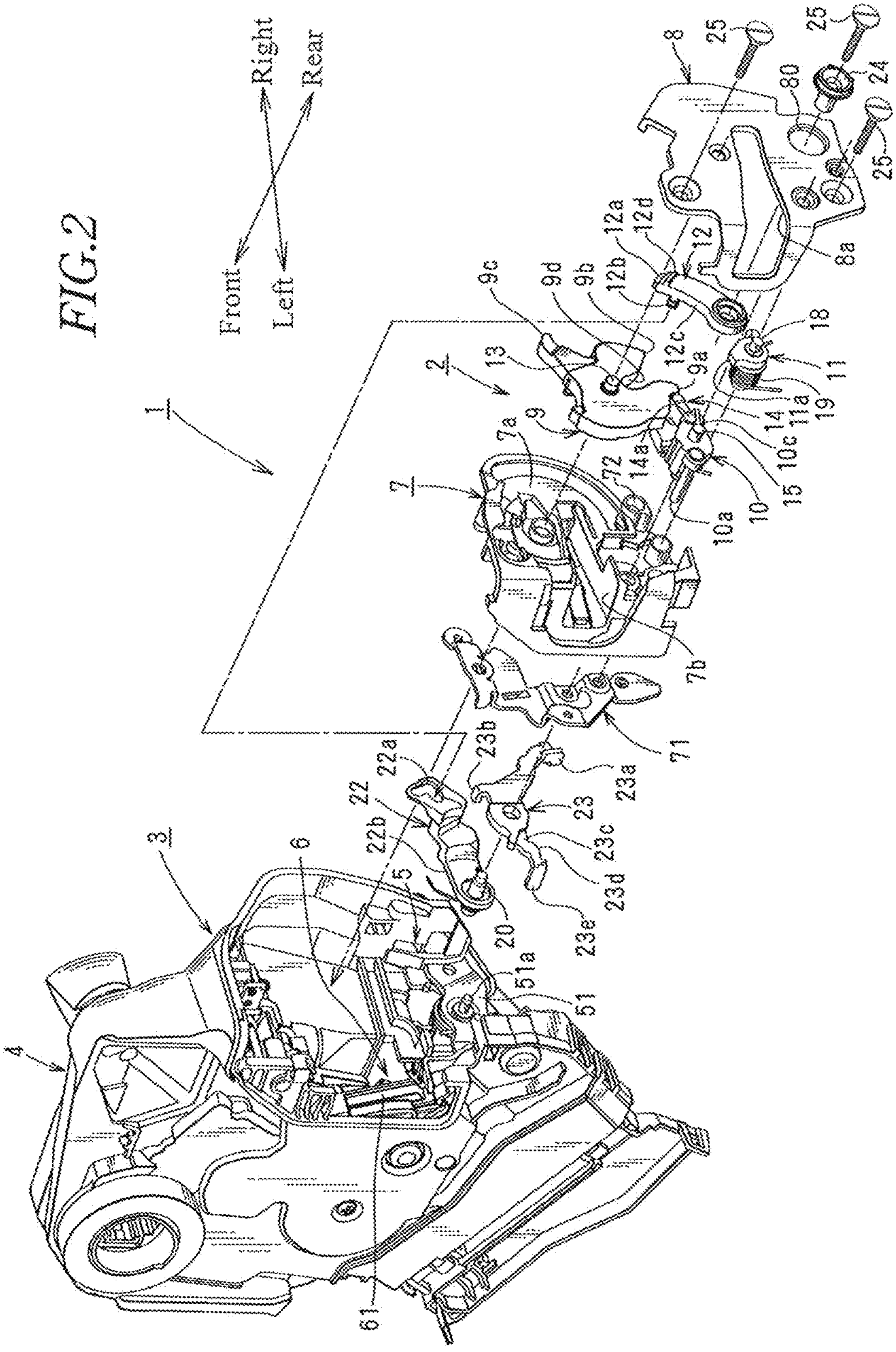
FIG. 2 is an exploded perspective view showing the vehicle door latch device shown in FIG. 1.
Figure 3:
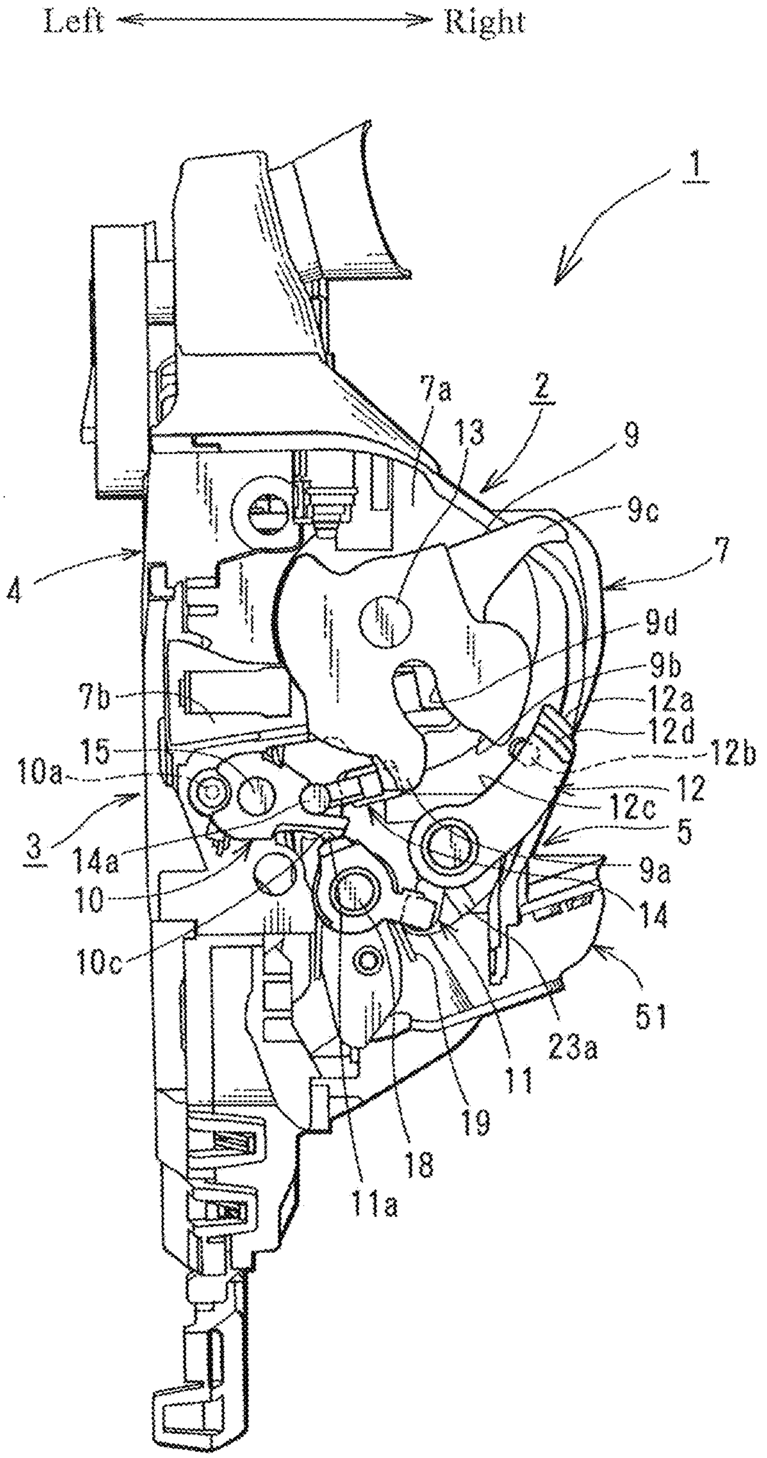
FIG. 3 is a front elevational view showing the vehicle door latch device shown in FIG. 1 with a cover plate removed.
Figure 4:
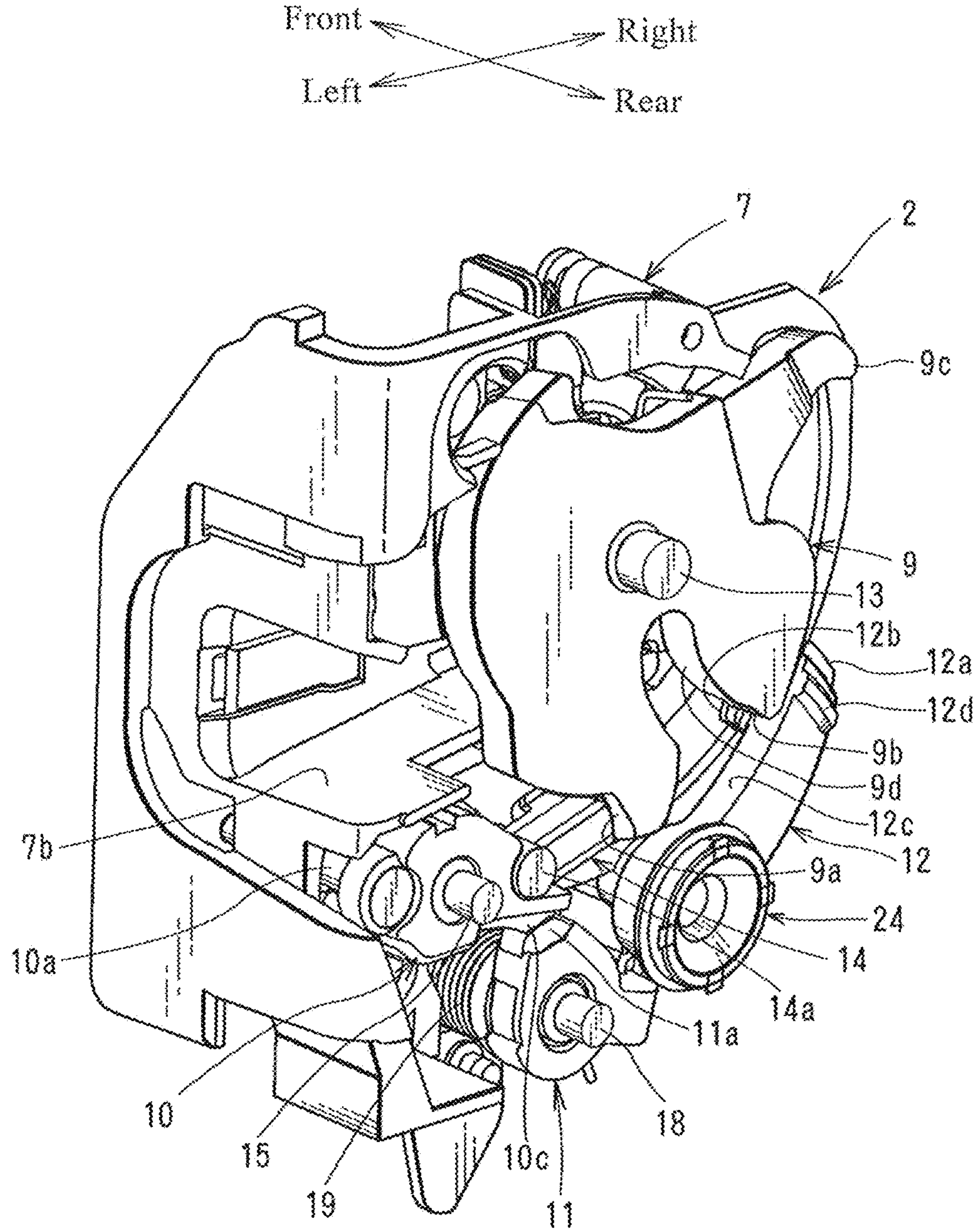
FIG. 4 is a perspective view showing an engagement assembly of the vehicle door latch device shown in FIG. 1 from a rearward.

Hereinafter, the present invention is explained in detail by referring to an embodiment according to the drawings. As shown in FIGS. 1 to 3, a vehicle door latch device 1 is fixed to a door (not shown) which is supported to a vehicle body to be capable of opening and closing, and the vehicle door latch device 1 is provided with an engagement assembly 2 and an operation assembly 3 arranged in a front side of the engagement assembly 2, wherein the engagement assembly 2 comprises a plurality of engagement members for holding the door closed by engaging with a striker S on a vehicle body side and the operation assembly 3 comprises operating members capable of operating predetermined engagement members among the plurality of engagement members.

The operation assembly 3 has a casing 4 made of a synthetic resin, which forms an outer shell fixed to a front surface of a body 7 described below of the engagement assembly 2. The operation assembly 3 is formed by arranging a release mechanism 5 and a locking/unlocking mechanism 6 in the casing 4, wherein the release mechanism 5 comprises operating members capable of operating predetermined engagement members of the engagement assembly 2 and the locking/unlocking mechanism 6 comprises operating members capable of shifting operation of the release mechanism 5 between transmittable and untransmittable to the engagement members.

The release mechanism 5 comprises;

an outside lever 51 which is pivotably supported in the casing 4 at a predetermined angle by a shaft 51*a*, and is in conjunction with a door opening operation of an outside handle (not shown) provided on a vehicle-exterior side surface of the door;

an inside lever (not shown) which is supported in the casing 4 by a shaft (not shown), and is in conjunction with a door opening operation of an inside handle (not shown) provided on a vehicle-interior side surface of the door;

a motor (not shown) which is housed in the casing 4, and is driven based on an operation of a remote control switch carried by a user; and so forth, wherein when the locking/unlocking mechanism 6 is in an unlocked state described below, a releasing lever (not shown) operated by driving of the outside lever 51 or by driving of the motor is operated for releasing by an opening operation of the outside handle or the inside handle or by driving of the motor based on an operation of the remote control switch, this releasing operation is transmitted to a ratchet 10 described below of the engagement assembly 2, an engagement between a latch 9 described below of the engagement assembly 3 and the striker S is released, and thereby enabling the door to be opened. Incidentally, each of the outside lever 51 and the releasing lever in the present embodiment corresponds to a door-release-operation lever of the present invention.

The locking/unlocking mechanism 6 comprises a locking lever 61 capable of moving between an unlocked position and a locked position with a motive power of a motor (not shown) which is driven based on a manual operation of a key cylinder (not shown) provided on the vehicle-exterior side surface of the door and a locking knob (not shown) provided on the vehicle-interior side surface of the door, and is driven based on a locking/unlocking operation of the remote control switch. When the locking/unlocking mechanism 6 is in the unlocked state owing to that the locking lever 61 is in the unlocked position, the opening operations respective of the outside handle and the inside handle are enabled to make the door capable of opening. When the locking/unlocking mechanism 6 is in the locked state owing to that the locking lever 61 is in the locked position, the opening operations respective of the outside handle and the inside handle are disabled to make the door incapable of opening. However, the door can be always opened independently of the state of the locking/unlocking mechanism 6 by the motive power of the motor based on the releasing operation of the remote control switch. Incidentally, a detailed explanation and a drawing of the locking/unlocking mechanism 6 are omitted because the locking/unlocking mechanism 6 is not directly concerned with the present invention.

As shown in FIGS. 2 to 8, the engagement assembly 2 comprises;

a main body (not indicated by a reference sign) comprising the body 7 which is made of a synthetic resin and is fixed to an interior surface of the door by a plurality of fastening members 25, a cover plate 8 which is made of metal and closes an opening on a rear surface side of the body 7, and a back plate 71 which is made of metal and is fixed to a front surface side of the body 7;

the latch 9, the ratchet 10, a holding lever 11, and a third latch lever 12 which are the engagement members arranged in a housing part 7*a* between the body 7 and the cover plate 8; and a biasing lever 22 and a release transmission lever 23 which are the engagement members arranged on a front surface side of the back plate 71.

Incidentally, the cover plate 8 is omitted from FIG. 3 to clearly show each of the engagement members arranged in the housing part 7*a* of the body 7.

The body 7 comprises the housing part 7*a* and a striker entrance groove 7*b*, wherein a rear surface side of the housing part 7*a* is opened to arrange the latch 9, the ratchet 10, the holding lever 11, and the third latch lever 12, and wherein the striker entrance groove 7*b* is formed in a center portion in a vertical direction of the housing part 7*a* and the striker S can enter into the striker entrance groove 7*b* from a horizontal direction when the door is closed.

The cover plate 8 is fixed to the body 7 to close the housing part 7*a* of the body 7 from the rear surface side. The cover plate 8 has a striker entrance notch 8*a* into which the striker S can enter from the horizontal direction when the door is closed.

Figure 12:
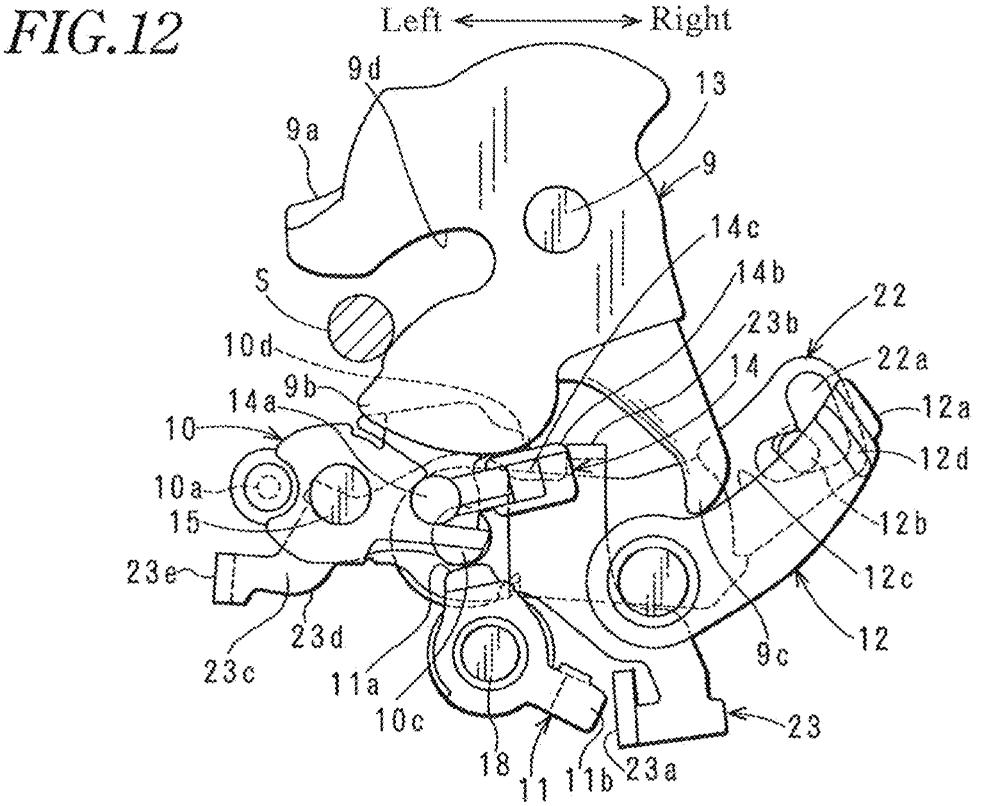
FIG. 12 is a front elevational view showing the engagement members when the vehicle door latch device is in an open state.
Figure 13:
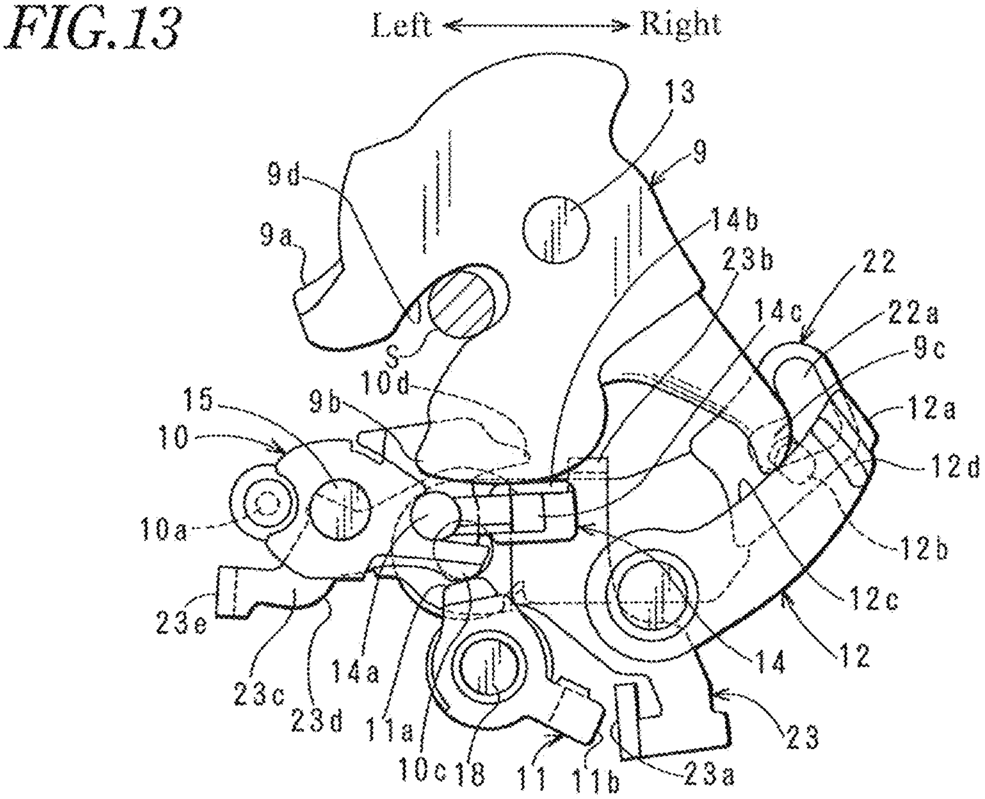
FIG. 13 is a front elevational view showing the engagement members when the vehicle door latch device is in a halfway state of a closing operation.
Figure 14:
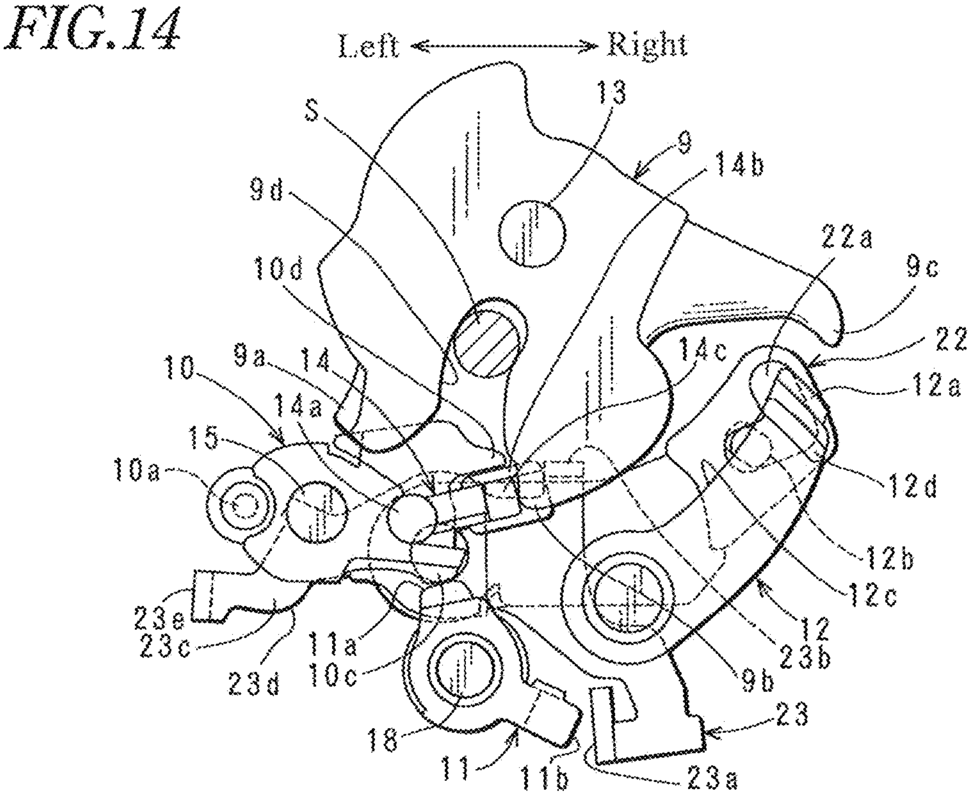
FIG. 14 is a front elevational view showing the engagement members when the vehicle door latch device is in an half-latched state.
Figure 15:
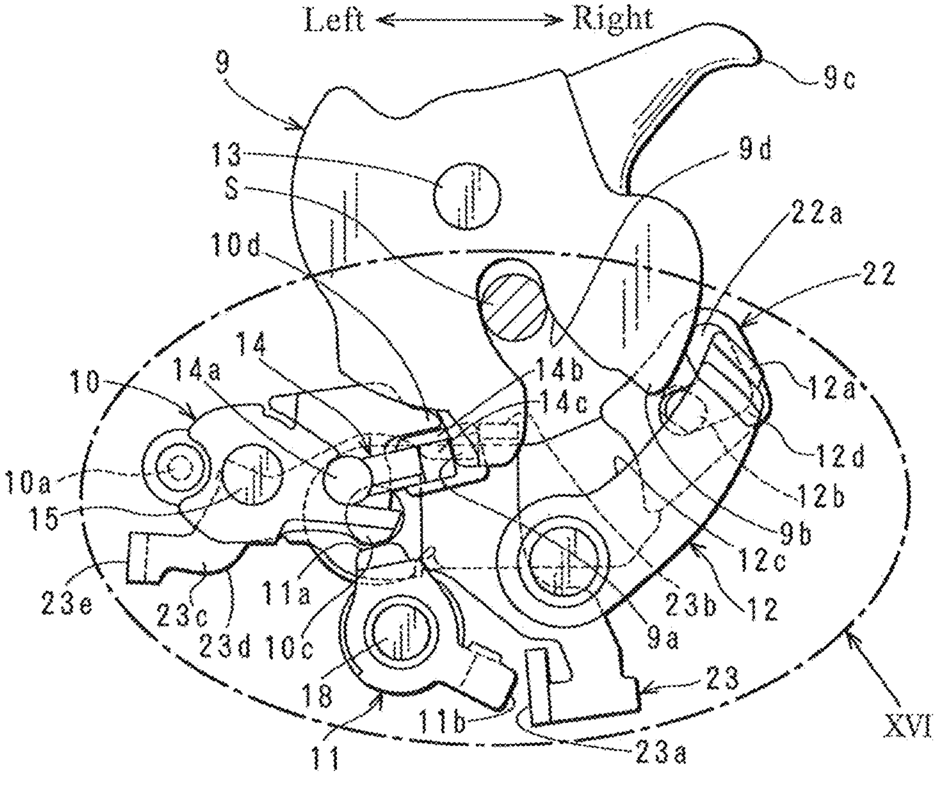
FIG. 15 is a front elevational view showing the engagement members when the vehicle door latch device is in a fully-latched state.

The latch 9 is pivotably supported in the housing part 7*a* of the body 7 at a predetermined angle by a shaft 13 oriented in a longitudinal direction, is biased in an opening direction (a clockwise direction in FIG. 3 and a counterclockwise direction in FIG. 8) by a spring 26, is made to pivot in a closing direction (a counterclockwise direction in FIG. 12) from an open position shown in FIG. 12 corresponding to an open position of the door against a biasing force of the spring 26 when the striker S enters into the striker entrance groove 7*b* of the body 7 and the striker entrance notch 8*a* of the cover plate 8 owing to a closing operation of the door, and is made to pivot to a fully-latched position shown in FIG. 15 corresponding to a fully-closed position of the door via a half-latched position corresponding to a half-door position of the door shown in FIGS. 13, 14.

Figure 21:
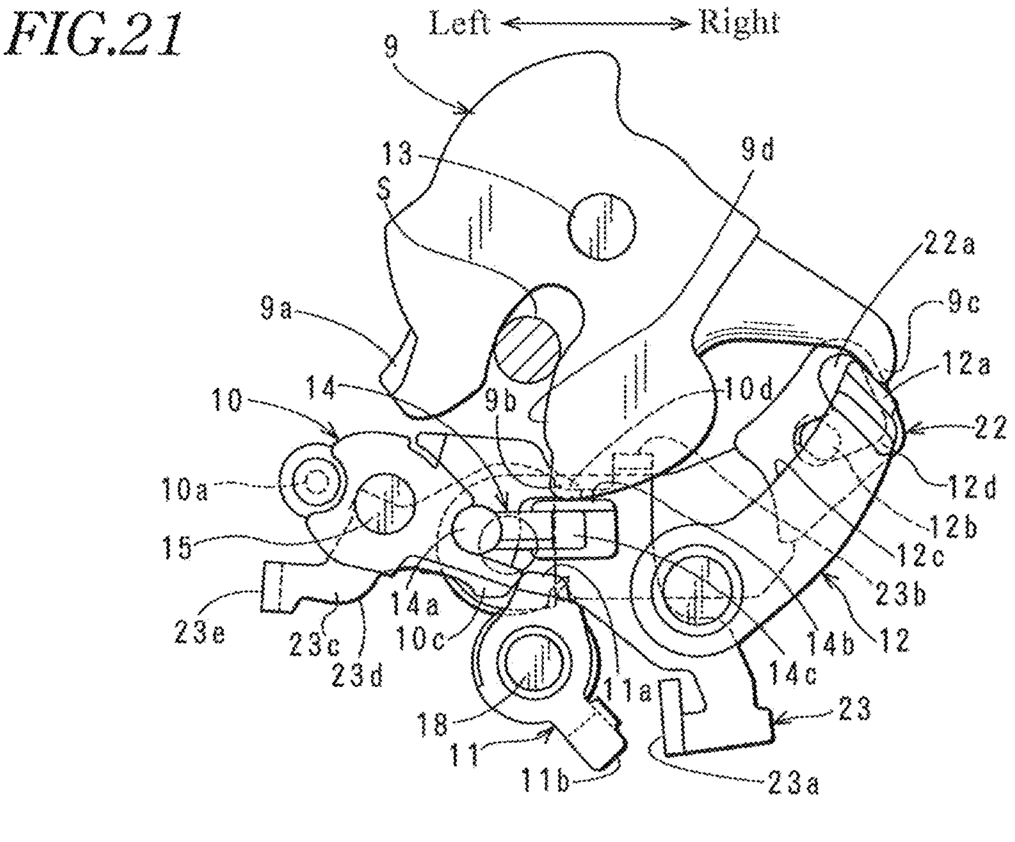
FIG. 21 is a front elevational view showing the engagement members when the vehicle door latch device is in a third latch state.

A peripheral portion of the latch 9 is provided with a fully-latched engagement portion 9*a*, a half-latched engagement portion 9*b*, and a third engagement portion 9*c*, wherein the fully-latched engagement portion 9*a* is capable of engaging with a pawl 14 formed on an end portion of the ratchet 10 when the latch 9 is in the fully-latched position shown in FIG. 15, wherein the half-latched engagement portion 9*b* is capable of engaging with the pawl 14 of the ratchet 10 when the latch 9 is in the half-latched position shown in FIG. 14, and wherein the third engagement portion 9*c* is capable of engaging with a pawl portion 12*a* formed at an exterior end portion of the third latch lever 12 when the latch 9 is in a third latch position shown in FIG. 21, the third latch position being between the open position and the half-latched position and corresponding to a door-half-open-state determinable position where a half-open state of the door can be determined. Moreover, an engagement groove 9*d* is formed between the fully-latched engagement portion 9*a* and the half-latched engagement portion 9*b* of the latch 9, and the striker S entering into the striker entrance groove 7*b* of the body 7 and the striker entrance notch 8*a* of the cover plate 8 can engage with the engagement groove 9*d* when the door is closed.

The ratchet 10 is pivotably supported in the housing part 7*a* of the body 7 at a predetermined angle by a shaft 15 oriented in a longitudinal direction, is biased in an engagement direction (the counterclockwise direction in FIG. 3) by a biasing force of a spring 16 wound on the shaft 15, and is made to pivot in a releasing direction (the clockwise direction in FIGS. 3, 14, 15) from an engagement position shown in FIGS. 3, 14, 15 against the biasing force of the spring 16 based on the releasing operation of the outside lever 51 and the releasing lever. Moreover, the pawl 14 capable of respectively engaging with the fully-latched engagement portion 9*a* and the half-latched engagement portion 9*b* of the latch 9 is provided on one end portion of the ratchet 10 so as to be pivotable at a predetermined angle around a shaft oriented in the longitudinal direction, and an abutted portion 10*a* formed in a cylindrical shape and protruding forward is provided at the other end portion.

Incidentally, the biasing force of the spring 16 to bias the ratchet 10 in the engagement direction is smaller than that of a usual door latch device. Thus, an operating force for rotating the ratchet 10 in the releasing direction is reduced, and the door can be opened by a small operating force. Moreover, when the ratchet 10 is in the engagement position, the ratchet 10 is held in the engagement position by the holding lever 11 as described below to ensure the engagement of the pawl 14 of the ratchet 10 with the fully-latched engagement portion 9*a* and the half-latched engagement portion 9*b*.

Figure 16:
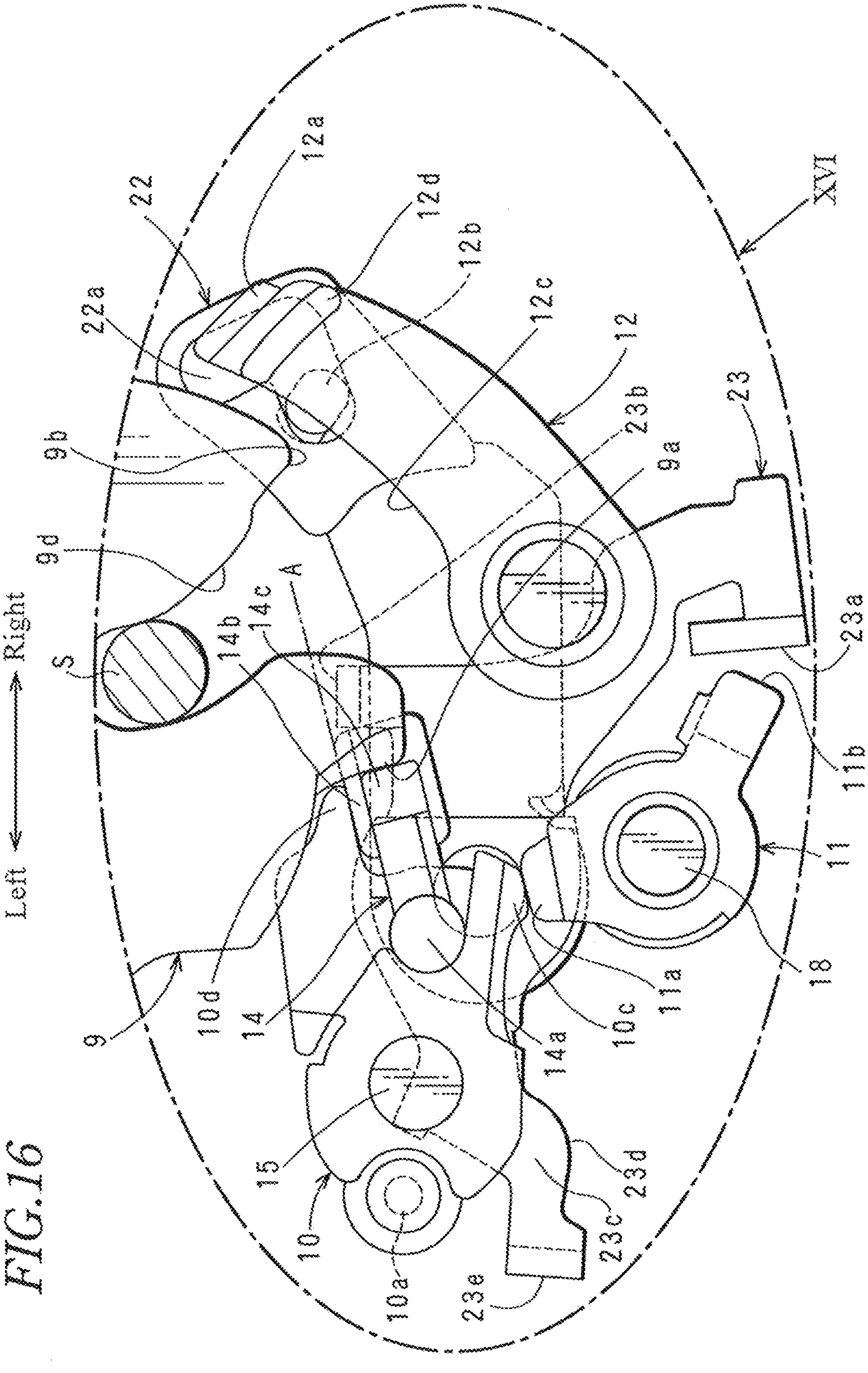
FIG. 16 is a partial enlarged view taken along the arrow XVI in FIG. 15.
Figure 17:
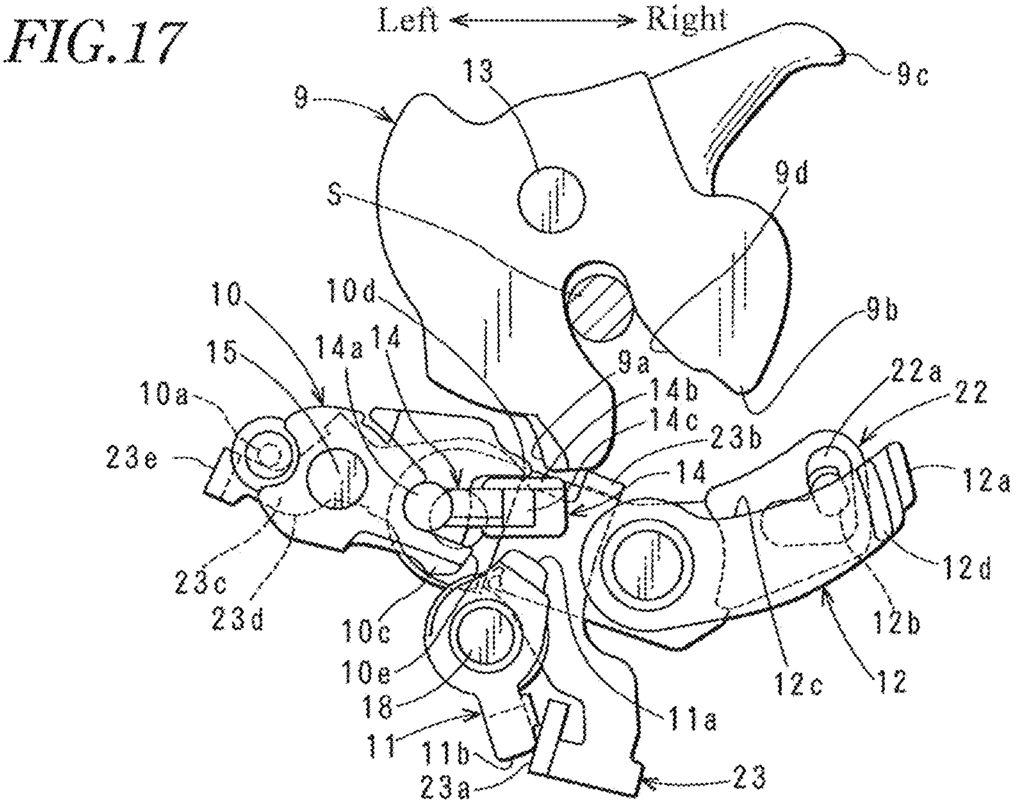
FIG. 17 is a front elevational view showing the engagement members when the vehicle door latch device is in a state of a releasing operation.

The pawl 14 is supported in a shaft hole 10*b* (see FIG. 6) formed in the end portion of the ratchet 10 by a shaft portion 14*a* oriented in the longitudinal direction so as to be pivotable at a predetermined angle. A tip portion of the pawl 14 is biased in an engagement direction (for example, the counterclockwise direction in FIG. 3) to respectively engage with the fully-latched engagement portion 9*a* and the half-latched engagement portion 9*b* of the latch 9 by a biasing force of a spring 17 of which one end portion is hooked on the pawl 14 and the other end portion is hooked on the ratchet 10. Normally, the pawl 14 is held in an engagement position (for example, a position shown in FIG. 16) where an abutting portion 14*b* formed on an upper surface of the pawl 14 abuts with an abutted portion 10*d* formed on the ratchet 10 from below with the biasing force of the spring 17. Thus, when the ratchet 10 is in the engagement position, the pawl 14 engages with the fully-latched engagement portion 9*a* or the half-latched engagement portion 9*b* of the latch 9 to hold the latch 9 in the fully-latched position or the half-latched position. As shown in FIG. 17, when the ratchet 10 pivots in the releasing direction, the pawl 14 disengages from the fully-latched engagement portion 9*a* or the half-latched engagement portion 9*b* of the latch 9, and thereby allowing the latch 9 to pivot in the opening direction.

The holding lever 11 is provided below the ratchet 10, is pivotably supported to the housing part 7*a* of the body 7 at a predetermined angle by a shaft 18 oriented in the longitudinal direction, and is biased in a holding direction (the counterclockwise direction in FIG. 3) by a spring 19 of which one end portion is hooked on the body 7 and the other end portion is hooked on the holding lever 11. Normally, for example, as shown in FIG. 16, a holding portion 11*a* formed on an upper-end portion of the holding lever 11 abuts with a held portion 10*c* formed on a lower portion of the ratchet 10 from below to block the ratchet 10 from the pivoting in the releasing direction (a direction in which the pawl 14 disengages from the fully-latched engagement portion 9*a* or the half-latched engagement portion 9*b* of the latch 9, for example, the clockwise direction in FIG. 16) around the shaft 15 from the engagement position. Moreover, the holding lever 11 pivots in the clockwise direction at a predetermined angle against a biasing force of the spring 19 to disengage the holding portion 11*a* from the held portion 10*c* of the ratchet 10, and thereby allowing the ratchet 10 to pivot in the releasing direction.

Figure 6:
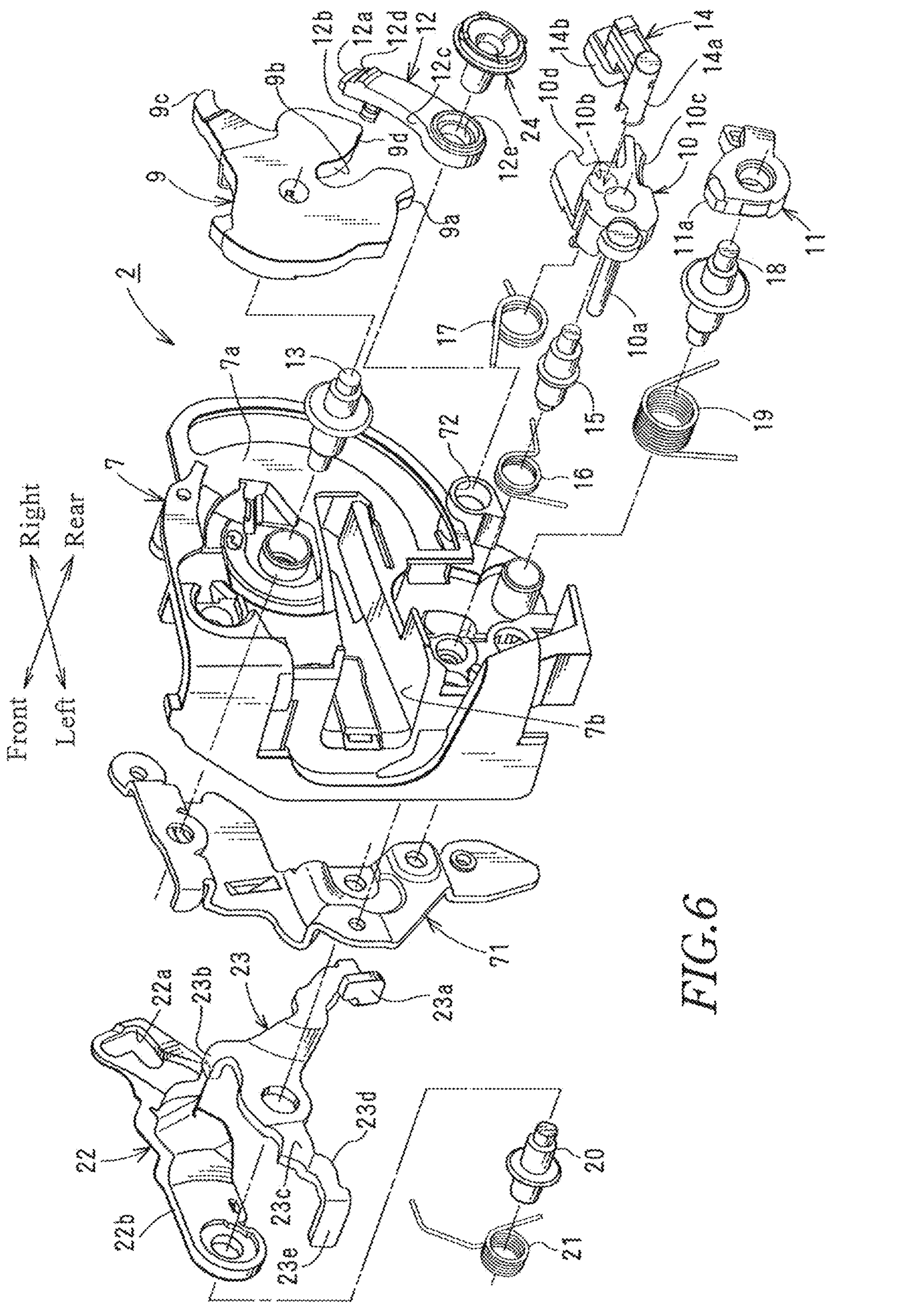
FIG. 6 is an exploded perspective view showing the engagement assembly shown in FIG. 4.
Figure 7:
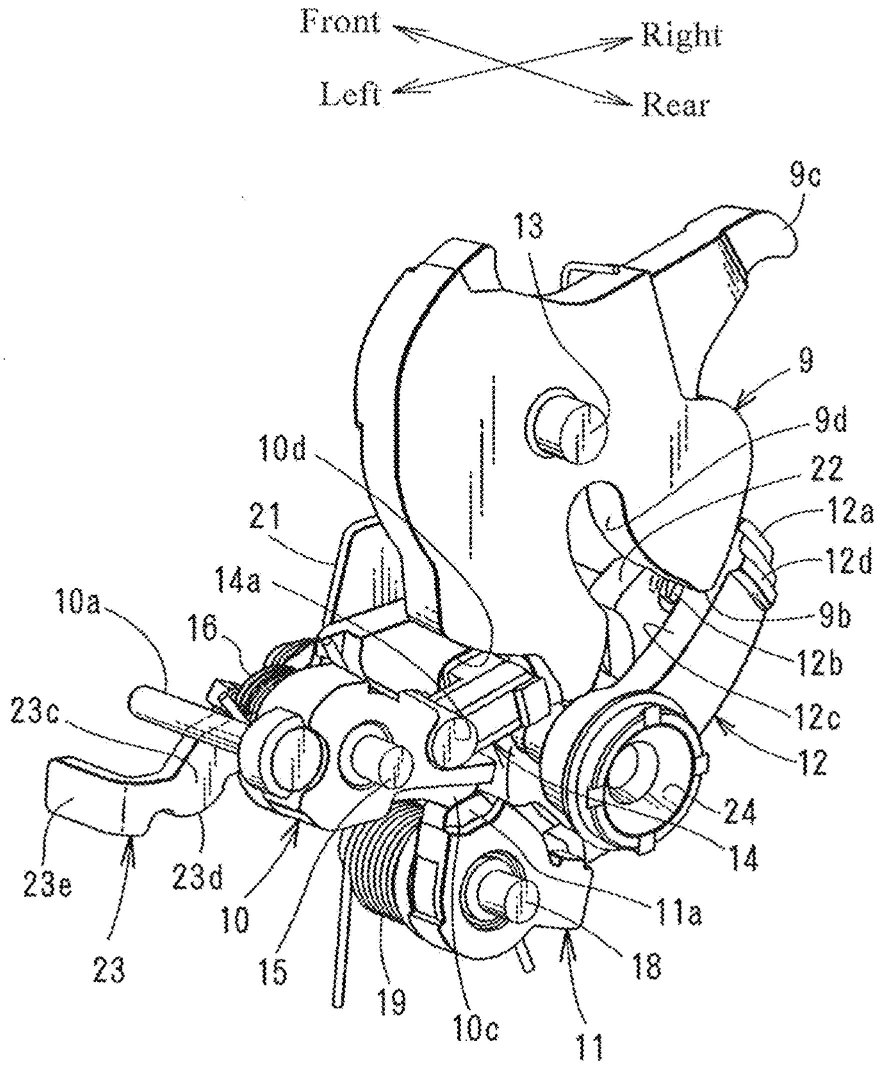
FIG. 7 is a perspective view showing engagement members of the engagement assembly shown in FIG. 4 from a rearward.
Figure 8:
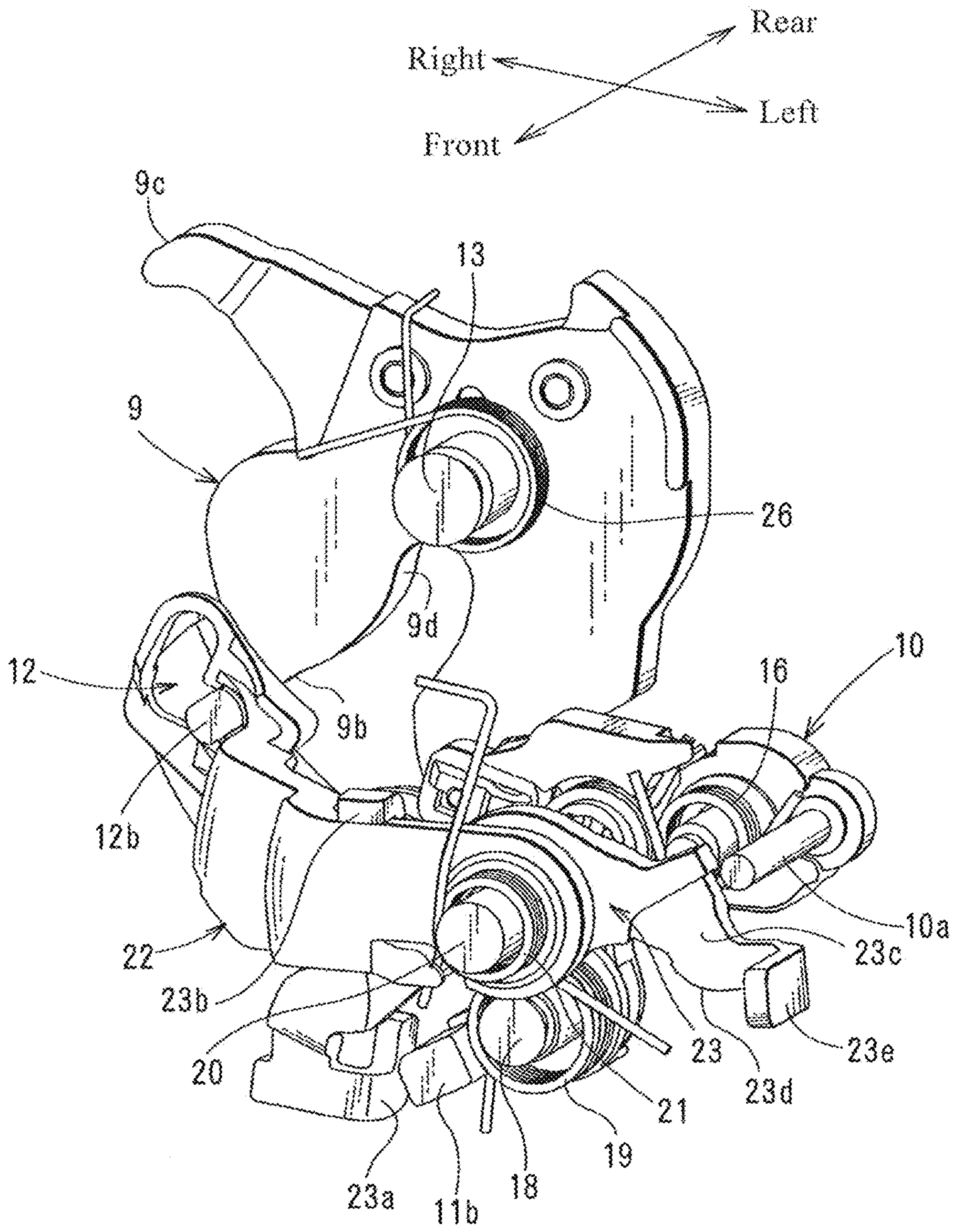
FIG. 8 is a perspective view showing the engagement members shown in FIG. 7 from a frontward.
Figure 9:
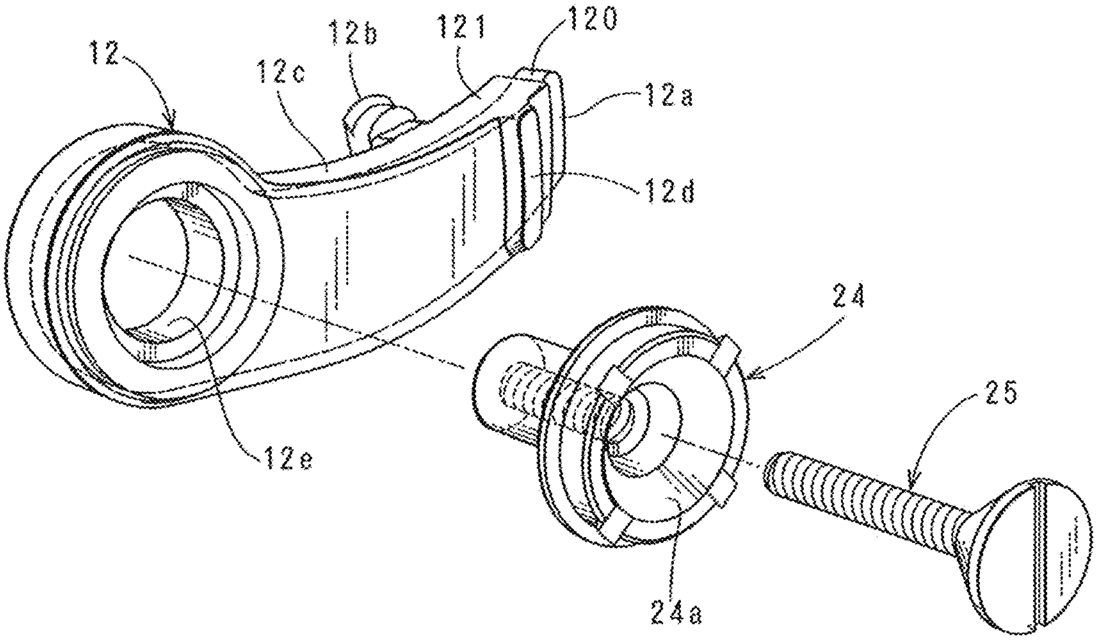
FIG. 9 is an exploded perspective view showing a third latch lever of the engagement members shown in FIG. 7 and a supporting member thereof.

As shown in FIGS. 2, 6, an interior end portion of the third latch lever 12 is pivotably supported in the housing part 7*a* of the body 7 at a predetermined angle by a supporting member 24. As shown in FIG. 9, the third latch lever 12 comprises:

- the pawl portion 12*a* which is provided at the exterior end portion thereof and is capable of engaging with the third engagement portion 9*c* in the third latch position of the latch 9,
- a protrusion portion 12*b* which is provided on a front surface side of the exterior end portion and is capable of engaging with an engagement hole 22*a* of the biasing lever 22,
- an upper edge portion 12*c* with which a tip of the third engagement portion 9*c* abuts when the latch 9 is positioned on the open direction side from the third latch position,
- a raised portion 12*d* provided on a surface facing the cover plate 8 on the exterior end portion, and
- a hole portion 12*e* provided in the interior end portion and into which the supporting member 24 is inserted.

As shown in FIG. 9, the third latch lever 12 has a structure in which a lever body 120 made of metal is covered with a resin portion 121 made of a synthetic resin, the lever body 120 is exposed at the pawl portion 12*a* and the hole portion 12*e*, and the protrusion portion 12*b*, the upper edge portion 12*c*, and the raised portion 12*d* are provided on the resin portion 121. Although not limiting, as the synthetic resin, it is possible to exemplify polyester system thermoplastic elastomer, polypropylene, polyamide, polyvinyl chloride, polyacetal, etc.

As shown in FIG. 21, the pawl portion 12*a* of the third latch lever 12 engages with the third engagement portion 9*c* of the latch 9 in a standby position of the third latch lever 12 to prevent the latch 9 from pivoting in the opening direction from the third latch position. As shown in FIG. 17, the pawl portion 12*a* of the third latch lever 12 retreats out of a moving locus of the third engagement portion 9*c* of the latch 9 in a retreating position of the third latch lever 12 to allow the latch 9 to pivot in the opening direction.

In a case where the latch 9 pivots in the opening direction from the fully-latched position or the half-latched position in an unsteady engagement state of the vehicle door latch device 1, when the latch 9 reaches the third latch position between the open position and the half-latched position, the pawl portion 12*a* engages with the third engagement portion 9*c* of the latch 9 to prevent the latch 9 to pivot in the opening direction.

When the latch 9 is positioned in the opening direction side from the third latch position shown in FIG. 21, a tip portion of the third engagement portion 9*c* of the latch 9 abuts with the upper edge portion 12*c* of the third latch lever 12 from above so that the third latch lever 12 is held in an intermediate position where the third latch lever 12 slightly pivots in the retreating direction (clockwise direction) from the standby position. When the latch 9 is positioned in the closing direction side (the counterclockwise direction side in FIG. 21) from the third latch position, the third latch lever 12 is in the standby position where the pawl portion 12*a* enters into the moving locus of the third engagement portion 9*c* of the latch 9.

As shown in FIG. 2, the supporting member 24 as a pivot shaft of the third latch lever 12 is inserted into holes 72, 80 which are provided in the body 7 and the cover plate 8 respectively, wherein the holes 72, 80 are for inserting the fastening member (such as screw, bolt) 25 fastening the door latch device 1 and the door panel. As shown in FIG. 9, the supporting member 24 is a tubular member having an enlarged head portion, and a hollow portion of the supporting member 24 is formed with a screw thread fitting onto a screw thread of the fastening member 25. The head portion of the supporting member 24 is formed with a tapered recessed portion 24*a* having a complementary shape with a tapered shape of a head portion of the fastening member 25. In the shown example, a countersunk head screw is used as the fastening member 25, the head portion of the supporting member 24 is formed with the tapered recessed portion 24*a* having a complementary shape with a tapered shape of a head portion of the countersunk head screw. By fixing the fastening member 25 to the hollow portion of the supporting member 24 inserted into the holes 72, 80 provided in the body 7 and the cover plate 8 respectively via the door panel of a vehicle door, the head portion of the fastening member 25 is fitted to the tapered recessed portion 24*a* of the supporting member 24 to be fastened rigidly (in the shown example, the head portion of the countersunk head screw 25 is fitted to the tapered recessed portion 24*a* of the head portion of the supporting member 24), thereby capable of increasing a strength of the shaft portion fastening the door latch device 1 to the door panel.

In this way, the supporting member 24 has a function as a pivot shaft for the third latch lever 12 and a function for fastening the vehicle door latch device 1 to the door panel. Since the holes 72, 80 provided in the body 7 and the cover plate 8 respectively can be used to insert the supporting member 24, it is not necessary to provide a shaft separately to support the third latch lever 12, and thus it is not necessary to enlarge the door latch device 1 even though the third latch lever 12 is provided.

Figure 5:
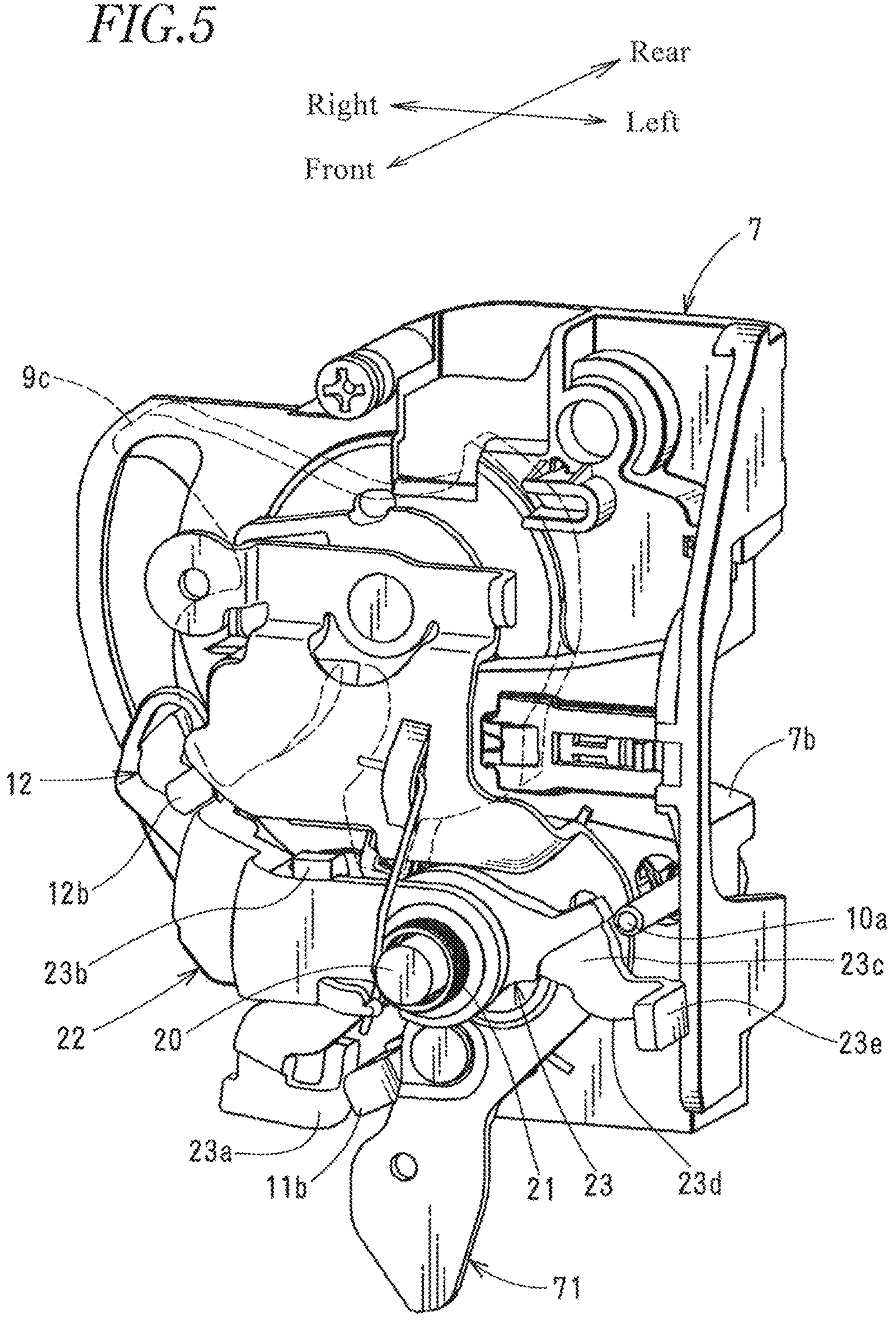
FIG. 5 is a perspective view showing the engagement assembly shown in FIG. 4 from a frontward.

As shown in FIGS. 2, 5, 6, and 8, each of the biasing lever 22 and the release transmission lever 23 is pivotably supported to the body at a predetermined angle on a front side of the back plate 71. An interior end portion of the biasing lever 22 is supported by the pivot shaft 20, an exterior end portion of the biasing lever 22 is provided with the engagement hole 22*a* which is formed in a L-like shape and with which the protrusion portion 12*b* of the third latch lever 12 engages, and an abutted portion 22*b* on an upper edge of the biasing lever 22 is abutted with a second abutting portion 23*b* of the release transmission lever 23. A pivot shaft is formed by engaging the protrusion portion 12*b* of the third latch lever 12 with the engagement hole 22*a* of the biasing lever 22 so that the biasing lever 22 and the third latch lever 12 are linked to operate together. The biasing lever 22 biases the third latch lever 12 in an engagement direction (the direction in which the pawl portion 12*a* of the third latch lever 12 engages with the third engagement portion 9*c* of the latch 9: the counterclockwise direction in FIG. 3) via the protrusion portion 12*b* by a biasing force of the biasing member 21. As the biasing member 21, a spring 21 which is wound on the shaft 20, of which an end portion is hooked on the back plate 71, and of which the other end portion is hooked on the biasing lever 22 is preferable as shown in FIG. 5.

The release transmission lever 23 comprises a first abutting portion 23*a* provided at the exterior end portion to be capable of abutting with an abutted portion 11*b* provided at an lower end portion of the holding lever 11 when the release transmission lever 23 pivots from the standby position in the retreating direction, the second abutting portion 23*b* provided at an exterior side from the shaft 20 to abut with the abutted portion 22*b* on the upper edge of the biasing lever 22, a third abutting portion 23*c* provided at an interior end portion to be capable of abutting with the abutted portion 10*a* of the ratchet 10 form below, a first abutted portion 23*d* which is provided at a lower side of the third abutting portion 23*c* and with which a sub lever (not shown) coupled with the outside lever 51 abuts from below, and a second abutted portion 23*e* with which the releasing lever operated by a driving of the motor abuts.

The release transmission lever 23 pivots in the retreating direction (the clockwise direction in FIG. 15) at a predetermined angle from the standby position exemplarily shown in FIG. 15 to a retreating position shown in FIG. 17 against a biasing force of the spring 21 hooked on the biasing lever 22 in conjunction with the releasing operation of the outside lever 51 based on the door opening operation of the outside handle or the inside handle, or the releasing operation of the releasing lever based on the motive power of the motor. Incidentally, the releasing operation of the outside lever 51 is transmitted to the release transmission lever 23 by the abutting of the sub lever (not shown) coupled with the outside lever 51 with the first abutted portion 23*d* of the release transmission lever 23 from below. Moreover, the releasing operation of the releasing lever with the motor is transmitted to the release transmission lever 23 by the abutting of the releasing lever with the second abutted portion 23*e* provided at at an end portion of the release transmission lever 23.

When the release transmission lever 23 pivots in the retreating direction from the standby position, the first abutting portion 23*a* abuts with the abutted portion 11*b* of the holding lever 11 to make the holding lever 11 pivot in an allowed direction (the clockwise direction in FIG. 15) from a blocking position (for example, a position shown in FIG. 15).

When the release transmission lever 23 pivots in the retreating direction from the standby position, the third abutting portion 23*c* abuts with the abutted portion 10*a* of the ratchet 10 from below to make the ratchet 10 pivot in the releasing direction from the engagement position.

The third abutting portion 23*c* abuts with the abutted portion 10*a* of the ratchet 10 after the holding portion 11*a* completely disengages from the held portion 10*c* of the ratchet 10 by the abutting of the first abutting portion 23*a* with the abutted portion 11*b* of the holding lever 11 to make the holding lever 11 pivot in the allowed direction.

When the release transmission lever 23 pivots in the retreating direction from the standby position, the second abutting portion 23*b* abuts with the abutted portion 22*b* on the upper edge in the exterior side from the shaft 20 of the biasing lever 22 from above so that the second abutting portion 23*b* makes the biasing lever 22 pivot at a predetermined angle in the retreating direction from the standby position against the biasing force of the spring 21 and makes the third latch lever 12 pivot at a predetermined angle in the retreating direction from the standby position via the protrusion portion 12*b*.

Figure 10:
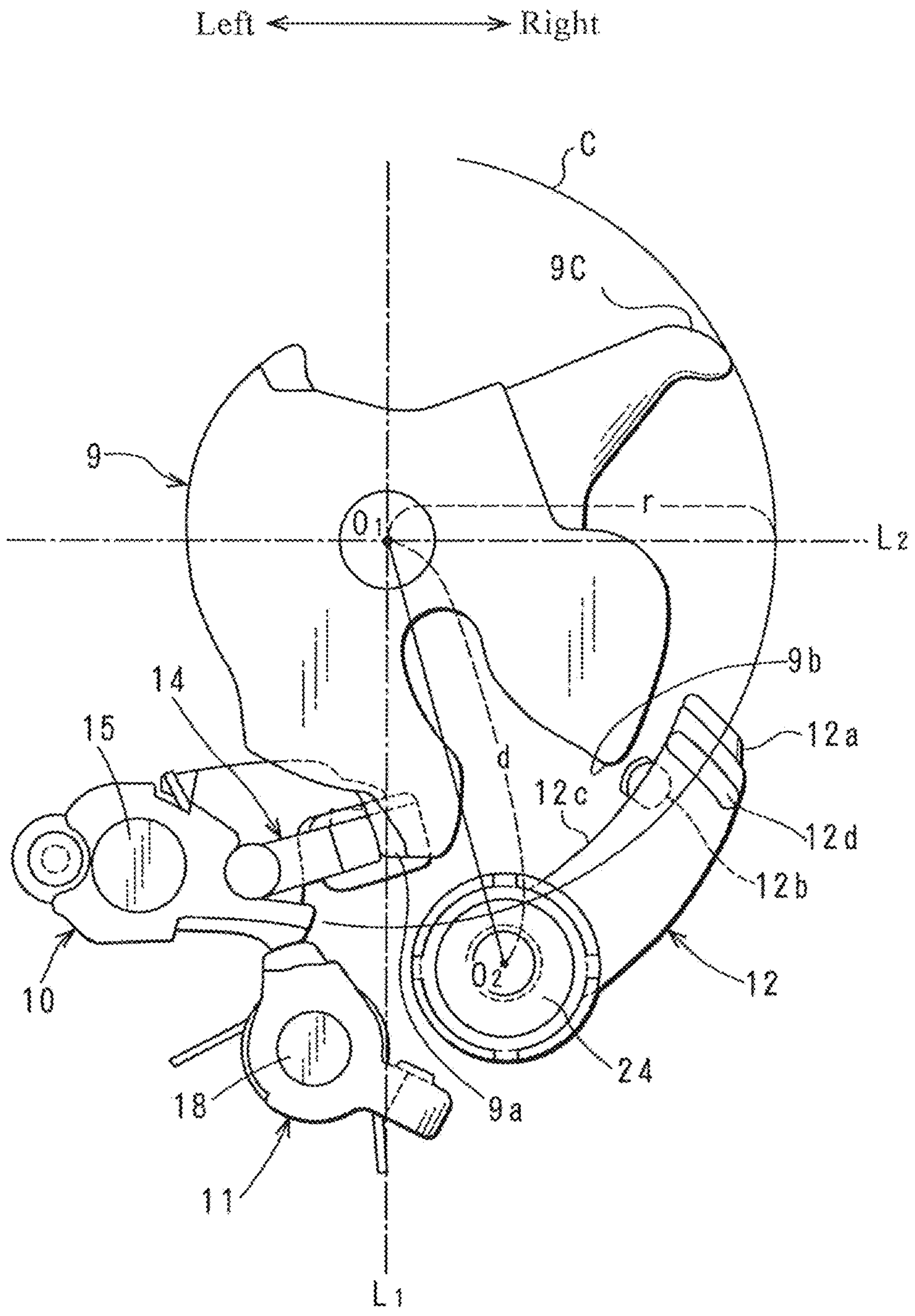
FIG. 10 is a front elevational view showing arrangement of principal parts of the engagement members.

As shown in FIG. 10, the third latch lever 12 is arranged on the same plane as the latch 9, and a pivot shaft 24 of the third latch lever 12 is provided at a position close to a pivoting locus of the latch 9 outside the pivoting locus. Therefore, a length of the third latch lever 12 can be substantially reduced to the minimum necessary so that a strength of the lever can be improved and a mass of the third latch lever 12 can be reduced.

For details, as shown in FIG. 10, when assuming that an axis center of the latch 9 is represented as $O_1$, that an outermost circular arc of the pivoting locus of the latch 9 is represented as C, that is, a circular arc of the moving locus of a distal end of the third engagement portion 9*c* is represented as C, that a radius of the circular arc C is represented as r, that an axis center of the third latch lever 12 is represented as $O_2$, and that a distance from the axis center $O_1$ of the latch 9 to the axis center $O_2$ of the third latch lever 12 is represented as d, a ratio d/r of the distance d to the radius r is preferably in a range of more than 1 and equal to or less than 1.3, and more preferably in a range of equal to or more than 1.05 and equal to or less than 1.25.

When assuming that a vertical line passing through the axis center $O_1$ of the latch 9 is represented as $L_1$, the axis center $O_2$ of the third latch lever 12 is arranged on a side of the third engagement portion 9*c* with respect to the vertical line $L_1$. Moreover, the pawl portion 12*a* of the third latch lever 12 is made to engage with the third engagement portion 9*c* of the latch 9 in a lower side of a horizontal line $L_2$ passing through the axis center $O_1$ of the latch 9.

In the present invention, since a fuction for making the holding lever 11 pivot from the blocking position is performed by the release transmission lever 23 provided on the front surface side of the back plate 71, the pivot shaft 24 of the third latch lever 12 can be arranged close to the pivot shaft 18 of the holding lever 11, the pivot shaft 18 being arranged on an opposite side of the pivot shaft 24 of the third latch lever 12 with respect to the vertical line $L_1$ in a vicinity of the vertical line $L_1$. Moreover, as described above, since the third latch lever 12 is provided at the position close to the pivoting locus of the latch 9, the third latch lever 12 can be arranged at a position as close as possible to the third engagement portion 9*c*. Thus, a space occupied by the third latch lever 12 can be reduced as small as possible.

In the present invention, the ratchet 10, the pawl 14, the holding lever 11, and the third latch lever 12 each of which acts on the engagement with the striker S are arranged on the same plane side as the latch 9 supported on the body 7, and the biasing lever 22 and the release transmission lever 23 each of which relays the operation of the engagement are arranged on the plane on the opposite side of the body 7. The number of levers arranged on an engagement surface of the latch 9 is minimized as the ratchet 10, the pawl 14, the holding lever 11, and the third latch lever 12, thereby capable of forming the engagement surface in a small size. Since the third latch lever 12 is arranged on the same plane as the latch 9, there is no need to offset the engagement portion (the pawl portion 12*a*) of the third latch lever 12 with respect to the latch 9, and the third latch lever 12 can be made smaller accordingly.

Figure 11:
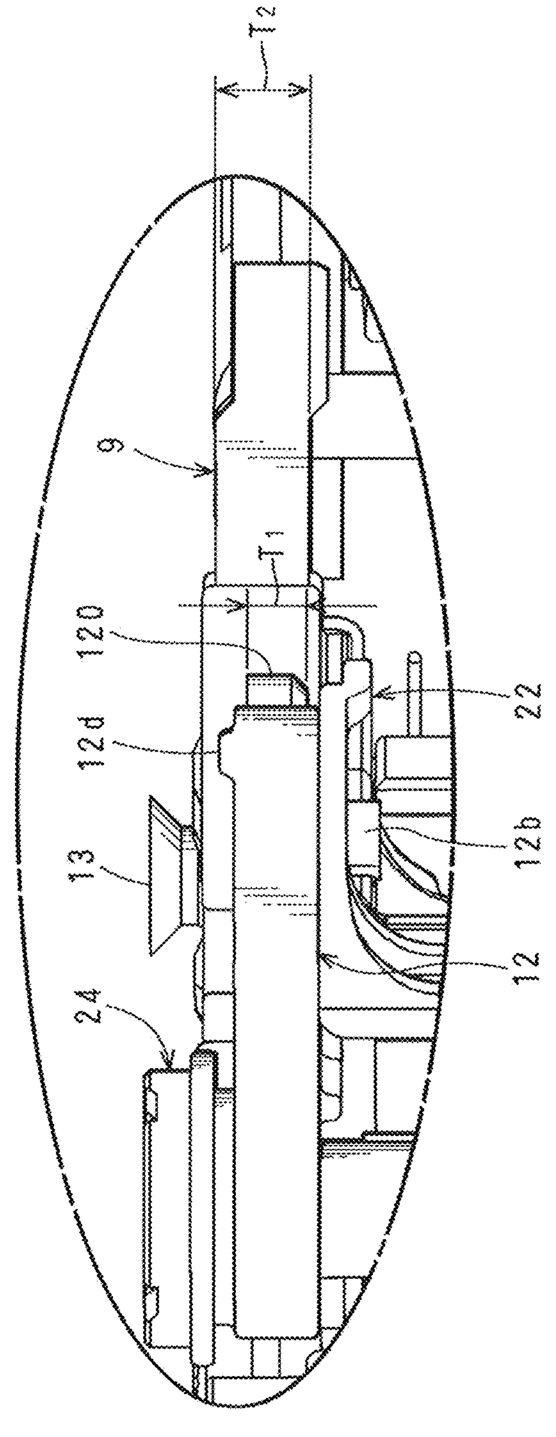
FIG. 11 is a partial enlarged view showing a relation of thickness between a latch and a third latch lever of the engagement members shown in FIG. 7 from a lower right oblique side.

As shown in FIG. 11, a plate thickness $T_1$ of the third latch lever 12 (a plate thickness of the lever body 120 made of metal) is smaller than a plate thickness $T_2$ of the latch 9. Since the third latch lever 12 is not usually used for the engagement with the striker S, a necessary strength of the third latch lever 12 can be ensured while making it lighter by making the plate thickness $T_1$ of the third latch lever 12 (a plate thickness of the lever body 120 made of metal) thinner than the plate thickness $T_2$ of the latch 9.

In a vicinity of the pawl portion 12*a* having the engagement surface against the third engagement portion 9*c* on the third latch lever 12, the raised portion 12*d* provided on the surface facing the cover plate 8 (see FIG. 2) is provided so as to be close to the cover plate 8. Even if torsion occurs in the levers due to collision or the like, the raised portion 12*d* abuts with the cover plate 8 such that it is capable of reducing the torsion of the third latch lever 12 to prevent the third latch lever 12 from disengaging from the biasing lever 22 and/or the latch 9. Moreover, as described above, since the raised portion 12*d* is made of the synthetic resin, it is capable of reducing a generating sound even though the raised portion 12*d* comes into sliding contact with the cover plate 8.

Next, based on FIGS. 12 to 21, there is described an operation of the vehicle door latch device 1 of the present invention.

At first, a closing operation of the door is described.

When the door D is in an open state, as shown in FIG. 12, the latch 9 is in the open position, the ratchet 10 and the pawl 14 are in the respective engagement positions, the holding lever 11 is in the blocking position where the holding portion 11*a* abuts with the held portion 10*c* of the ratchet 10, the third latch lever 12 is in the intermediate position where the third engagement portion 9*c* of the latch 9 abuts with the upper edge portion 12*c*, and the biasing lever 22 and the release transmission lever 23 are in the respective standby positions.

When the door is closed from this state, as shown in FIG. 13, the striker S enters into the striker entrance groove 7*b* of the body 7 and the striker entrance notch 8*a* of the cover plate 8 to engage with the engagement groove 9*d* of the latch 9. Thus, the latch 9 pivots around the shaft 13 in the closing direction (the counterclockwise direction in FIG. 12) from the open position. In this case, as shown in FIG. 13, owing to the pivoting of the latch 9 in the closing direction, the tip portion of the third engagement portion 9*c* slidably moves in a right direction while it contacts the upper edge portion 12*c* of the third latch lever 12, and a tip portion of the half-latched engagement portion 9*b* contacts the upper surface of the pawl 14 to forcibly move only the pawl 14 in the retreating and releasing direction against the biasing force of the spring 17 while the ratchet 10 is held in the engagement position.

Then, as shown in FIG. 14, when the latch 9 reaches the half-latched position, the pawl 14 engages with the half-latched engagement portion 9*b* of the latch 9 with the biasing force of the spring 17, and the third latch lever 12 pivots from the intermediate position to the standby position with the biasing force of the spring 21.

Moreover, owing to the closing operation of the door, when the latch 9 further pivots in the closing direction, the latch 9 moves the pawl 14 in the retreating and releasing direction again because a tip portion of the fully-latched engagement portion 9*a* of the latch 9 contacts the upper surface of the pawl 14. Then, as shown in FIG. 15, when the latch 9 reaches the fully-latched position corresponding to the fully-closed position of the door, the pawl 14 returns to the engagement position with the biasing force of the spring 17 to engage with the fully-latched engagement portion 9*a* of the latch 9, and thereby holding the door in the fully-closed position. When the pawl 14 steadily engages with the fully-latched engagement portion 9*a* until it reaches a regular position, as shown in FIG. 16, a tip portion 14*c* of the pawl 14 is positioned in a point A (see FIG. 16) where the pawl 14 deeply engages with the fully-latched engagement portion 9*a*, and the holding lever 11 blocks the ratchet 10 from pivoting in the releasing direction by the abutting of the holding portion 11*a* with the held portion 10*c* of the ratchet 10.

As described above, in the motor-vehicle door latch device 1, when the latch 9 pivots in the closing direction, only the pawl 14 which is a comparatively small member is made to pivot in the releasing direction in conjunction with the pivoting of the latch 9 in the closing direction, without a whole of the ratchet 10 which is a comparatively large member is made to pivot in the releasing direction. Therefore, it is possible to improve a door closing sound when the door is closed to be more silent and to obtain an excellent door closing sound. When the latch 9 is in the fully-latched position and the pawl 14 provided with the ratchet 10 engages with the fully-latched engagement portion 9*a* of the latch 9, the holding portion 11*a* of the holding lever 11 abuts with the held portion 10*c* of the ratchet 10 to block the ratchet 10 from pivoting in the releasing direction. Therefore, it is possible to make the engagement of the pawl 14 with the fully-latched engagement portion 9*a* steady.

Next, an opening operation of the door is explained.

As shown in FIGS. 15, 16, when the door D is held in a fully-closed state, the latch 9 is in the fully-latched position, the ratchet 10 and the pawl 14 are in the respective engagement positions, the pawl 14 engages with the fully-latched engagement portion 9*a* of the latch 9, the holding lever 11 is in the blocking position where the holding portion 11*a* abuts with the held portion 10*c* of the ratchet 10, and the third latch lever 12 is in the standby position where the pawl portion 12*a* enters into the movement locus of the third engagement portion 9*c* of the latch 9.

In the case where the locking/unlocking mechanism 6 is in the unlocked state in the above-described situation, when the outside handle or the inside handle is operated to open the door, or when the motor is operated to release based on the releasing operation of the remote control switch, the release transmission lever 23 pivots in the retreating direction at a predetermined angle from the standby position, the biasing lever 22 pushed by the second abutting portion 23*b* pivots in the retreating direction at a predetermined angle from the standby position against the biasing force of the spring 21, and the third latch lever 12 of which the protrusion portion 12*b* engaging with the engagement hole 22*a* of the biasing lever 22 pivots in the retreating direction at a predetermined angle from the standby position to the retreating position shown in FIG. 17. Owing to this pivoting, the first abutting portion 23*a* of the release transmission lever 23 abuts with the abutted portion 11*b* of the holding lever 11 to make the holding lever 11 pivot in the allowed direction (the clockwise direction in FIGS. 15, 16) from the blocking position, and thereby moving the holding portion 11*a* in a direction to disengage from the held portion 10*c* of the ratchet 10. After the holding portion 11*a* of the holding lever 11 completely disengages from the held portion 10*c* of the ratchet 10, the third abutting portion 23*c* of the release transmission lever 23 abuts with the abutted portion 10*a* of the ratchet 10 from below to make the ratchet 10 pivot in the releasing direction from the engagement position, and thereby releasing the pawl 14 from the fully-latched engagement portion 9*a* of the latch 9. Thus, the latch 9 is allowed to pivot from the fully-latched position to the opening direction, normally, the door is pushed in the opening direction by a counterforce of a weatherstrip provided on a periphery of a door opening part, the latch 9 pivots to the open position, the striker S exites from the engagement groove 9*d* of the latch 9, and thereby enabling the door to be opened.

After the door is opened, when the door opening operation of the outside handle or the inside handle is stopped, or when the driving of the motor is stopped, the ratchet 10 returnes to the engagement position with the biasing force of the spring 16, the holding lever 11 pivots to the blocking position by the biasing force of the spring 19, the release transmission lever 23 and the biasing lever 22 pivot to the respective standby positions by the biasing force of the spring 21, the third latch lever 12 pivots to the intermediate position, and thereby reaching an open state shown in FIG. 12.

Next, an operation when an unsteady engagement state occurs is described.

Normally, when the locking/unlocking mechanism 6 of the vehicle door latch device 1 is in the unlocked state, the door is pushed in the opening direction by the counterforce of the weatherstrip owing to the opening operation of the outside handle, and thus the door is opened. However, in the case where the counterforce of the weatherstrip is lowered by influence such as an aged deterioration or an environment of winter, even though the outside handle is operated to open, the door is not pushed by the counterforce of the weatherstrip so that the latch 9 is sometimes stopped in the fully-latched position (or a position where the latch 9 is slightly moved in the opening direction), or movements of the respective members are sometimes lost owing to freezing of movable parts and so on.

Figure 18:
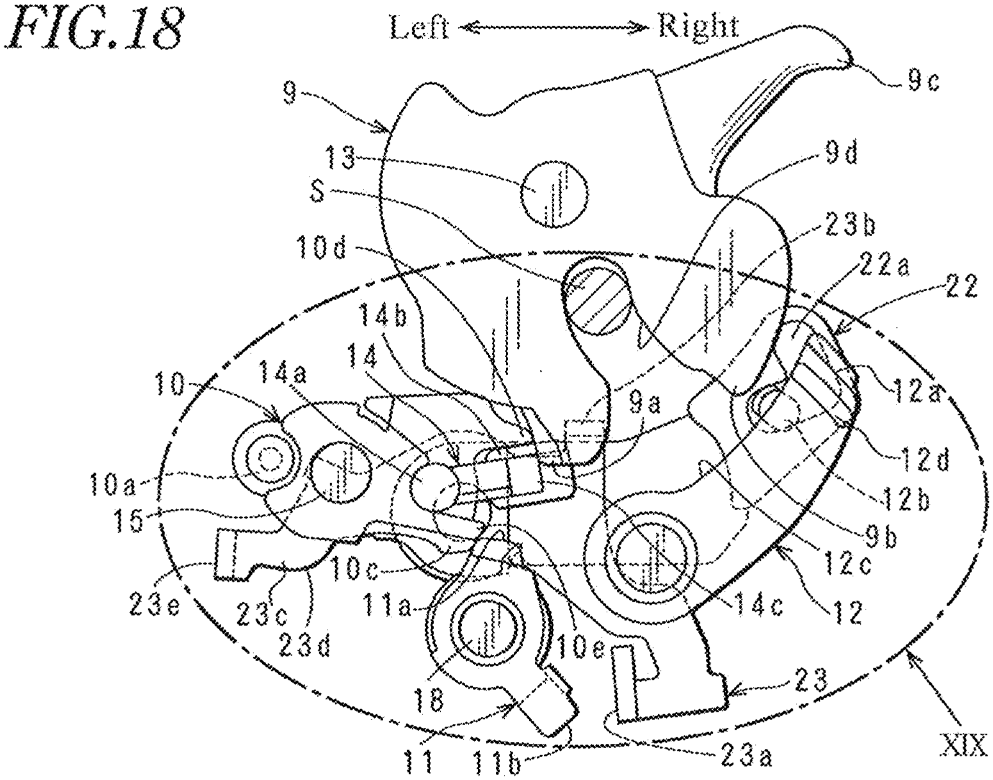
FIG. 18 is a front elevational view showing the engagement members when the vehicle door latch device is in an unsteady engagement state.
Figure 19:
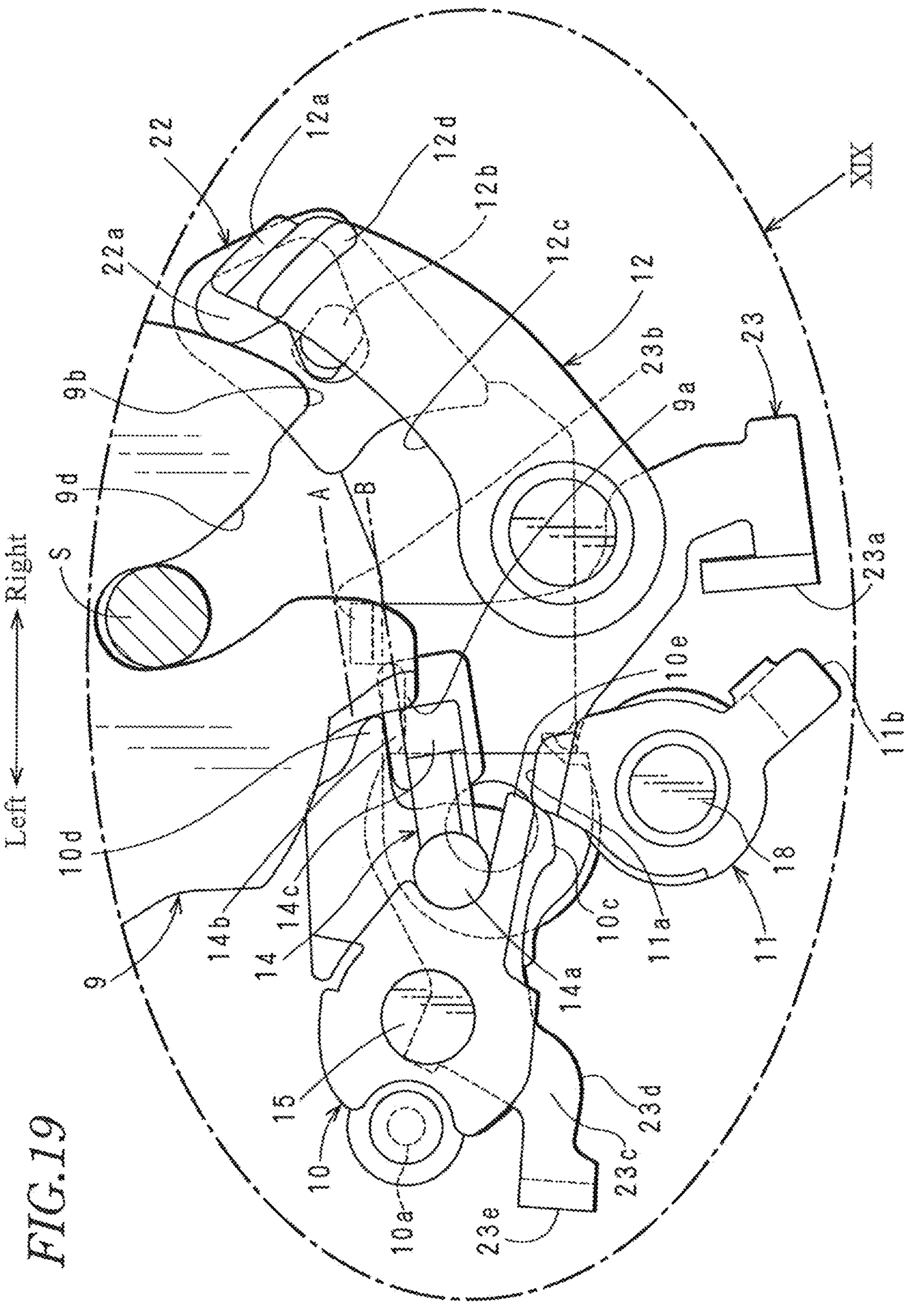
FIG. 19 is a partial enlarged view taken along the arrow XIX in FIG. 18.

Particularly among the respective members, in the case where the movement of the ratchet 10 is lost, when the ratchet 10 pivots in the engagement direction (the counterclockwise direction in FIG. 17) from the releasing position shown in FIG. 17 by the biasing force of the spring 16, a so-called unsteady engagement state sometimes occurs, wherein the unsteady engagement state is that the pawl 14 does not steadily engage with the fully-latched engagement portion 9*a* of the latch 9 stopped in the fully-latched position (or a position where the latch 9 is slightly moved in the opening direction) until it reaches a regular engagement position A as shown in FIG. 18 and in FIG. 19 in which the principal part shown in FIG. 18 is enlarged.

As shown in FIGS. 18, 19, when the unsteady engagement state occurs, the ratchet 10 stops at an unsteady engagement position B (see FIG. 19) where the pawl 14 does not engage with the fully-latched engagement portion 9*a* until it reaches the regular engagement position A, and the holding lever 11 stops before the blocking position by abutting of the holding portion 11*a* with a tip portion 10*e* of the ratchet 10. Thus, the ratchet 10 is pivotable in the releasing direction without it is blocked by the holding lever 11. The third latch lever 12 stops in the standby position where the pawl portion 12*a* enters into the movement locus of the third engagement portion 9*c* of the latch 9.

Figure 20:
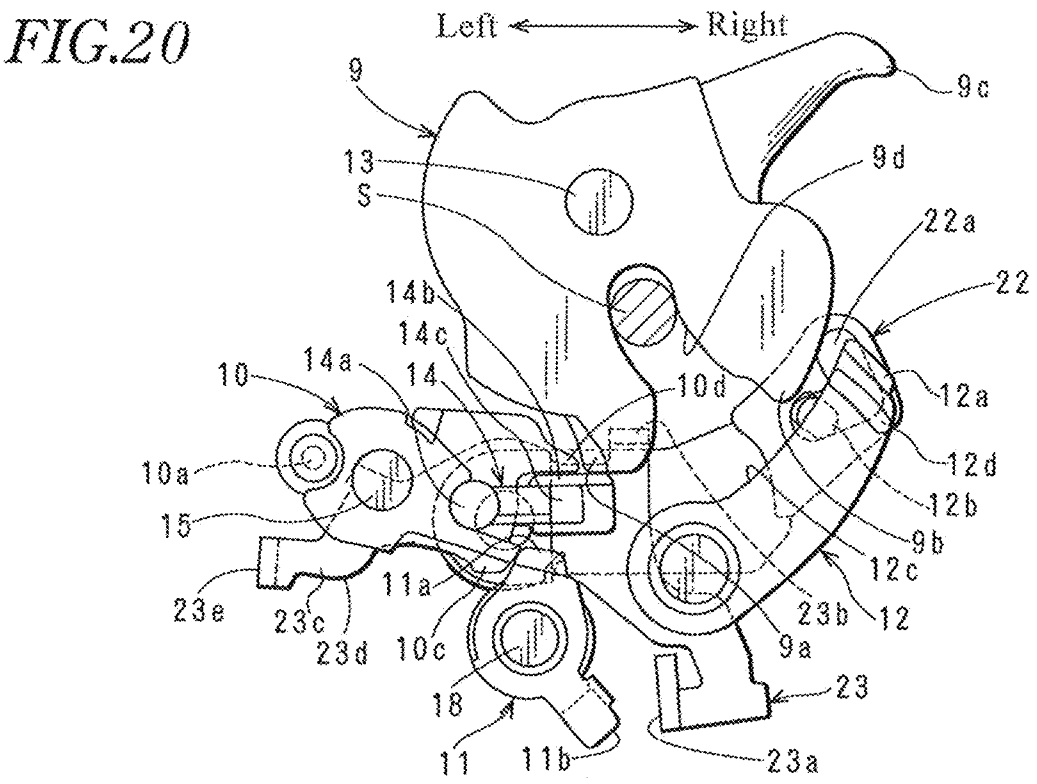
FIG. 20 is a front elevational view showing the engagement members when a force in an opening direction operates the latch of the vehicle door latch device in the unsteady engagement state.

In the case of the unsteady engagement state, when a large force operates to make the latch 9 pivot in the opening direction from the fully-latched position, the ratchet 10 is forcibly made to pivot in the releasing direction together with the pawl 14 that unsteadily engages with the fully-latched engagement portion 9*a*, and thereby disengaging the pawl 14 from the fully-latched engagement portion 9*a* as shown in FIG. 20. In the worst case, the pawl 14 cannot engage with the half-latched engagement portion 9*b*, and the latch 9 sometimes pivots to the open position.

However, in the case of the vehicle door latch device 1 of the present invention, in the third latch position where the latch 9 pivots in the opening direction from the state shown in FIG. 20 to slightly pass the half-latched position, the third engagement portion 9*c* of the latch 9 engages with the pawl portion 12*a* of the third latch lever 12 as shown in FIG. 21. Thus, the latch 9 is blocked from further pivoting in the opening direction, and is held in the third latch position to keep the engagement with the striker S. Thus, the door is opened slightly more than a half-door state, and is stopped in the door-half-open-state determinable position where the half-open state of the door can be easily determined in appearance, and is not opened further. Therefore, an occupant can surely recognize that the vehicle door latch device 1 had been in the unsteady engagement state.

In order to open the door from the state shown in FIG. 21, any of the outside handle, the inside handle, or the remote control switch is operated to open. Thus, the release transmission lever 23 and the biasing lever 22 pivot in the retreating direction at a predetermined angle from the respective standby positions, the third latch lever 12 in conjunction with this pivoting pivots in the retreating direction (the clockwise direction in FIG. 21) from the standby position, and the pawl 14 retreats out of the movement locus of the third engagement portion 9*c* of the latch 9 to allow the latch 9 to pivot in the opening direction. Simultaneously, the holding lever 11 pivots in the allowed direction and the ratchet 10 pivots in the releasing direction so that they move to respective positions where the rotation of the latch 9 in the opening direction is not blocked. Thus, the latch 9 moves to the open position to disengage the striker S from the engagement groove 9*d* of the latch 9, and thereby enabling the door to be opened.

As described above, in the vehicle door latch device 1 of the present embodiment, in the case of occurring the unsteady engagement state, when the pawl 14 of the ratchet 10 disengages from the fully-latched engagement portion 9*a* or the half-latched engagement portion 9*b* of the latch 9, the third latch lever 12 which is a different member from the pawl 14 of the ratchet 10 engages with the third engagement portion 9*c* provided on the latch 9 in the third latch position of the latch 9 to block the latch 9 from further pivoting in the opening direction from the third latch position, and thereby stopping the door in the door-half-open-state determinable position. Therefore, an occupant can surely recognize that the vehicle door latch device 1 had been in the unsteady engagement state.

As described above, one embodiment of the present invention is explained in detail by referring to the drawings, but the present invention is not limited to the above one embodiment and various changes and modifications may be added to the present embodiment without departing from the gist of the present invention. For example, the pawl 14 can be integrated into the ratchet 10.

What is claimed is:

1. A vehicle door latch device comprising:

a body fixed to a vehicle door;

a latch which is pivotably supported to the body at a predetermined angle to pivot in a closing direction from an open position by engaging with a striker on a vehicle body side when the vehicle door is closed, and to move to a fully-latched position via a half-latched position;

a ratchet pivotably supported to the body at a predetermined angle and provided with a pawl which blocks the latch from pivoting in an opening direction by respectively engaging with a half-latched engagement portion and a fully-latched engagement portion of the latch engaged with the striker;

a holding lever pivotably supported to the body at a predetermined angle to block the pawl from pivoting in a releasing direction to be released from the half-latched engagement portion or the fully-latched engagement portion by abutting with the ratchet when the pawl engages with the half-latched engagement portion or the fully-latched engagement portion; and a third latch lever pivotably supported to the body at a predetermined angle to engage with a third engagement portion provided on the latch when the latch is in a third latch position which is between the half-latched position and the open position so that the third latch lever blocks the latch from pivoting in the opening direction from the third latch position;

wherein the latch, the ratchet, the holding lever, and the third latch lever are provided on the same plane on the body, and a pivot shaft of the third latch lever is provided at a position close to a pivoting locus of the latch outside the pivoting locus, wherein the third latch lever has a pawl portion engaged with the third engagement portion of the latch and is biased towards a standby position where the pawl portion enters into a moving locus of the third engagement portion by a biasing force of a biasing member, wherein the vehicle door latch device further comprises:

a biasing lever pivotably supported to the body at a predetermined angle to be coupled with the third latch lever via a pivot shaft such that the biasing lever biases the third latch lever in a direction to engage with the third engagement portion by the biasing force of the biasing member, and a release transmission lever pivotably supported to the body at a predetermined angle to abut with the biasing lever such that the release transmission lever pivots based on a releasing operation of a door-release-operation lever and makes the biasing lever pivot in a retreating direction against the biasing force of the biasing member to make the third latch lever pivot in the retreating direction, wherein the biasing lever and the release transmission lever are arranged on a plane on the body opposite to the plane where the latch, the ratchet, the holding lever, and the third latch lever are arranged.

2. The vehicle door latch device according to claim 1, wherein the release transmission lever is further configured to abut with the ratchet and the holding lever, and pivots based on the releasing operation of the door-release-operation lever such that the release transmission lever makes the holding lever pivot in an allowed direction for allowing the ratchet to pivot in a releasing direction from a blocking position for blocking the ratchet from pivoting in the releasing direction, and makes the ratchet pivot in the releasing direction from an engagement position where the ratchet engages with the half-latched engagement portion or the fully-latched engagement portion of the latch.

3. The vehicle door latch device according to claim 2, wherein the release transmission lever moves the ratchet in the releasing direction from the engagement position after the release transmission lever moves the holding lever in the allowed direction from the blocking position.

4. The vehicle door latch device according to claim 1, wherein each of the biasing lever and the release transmission lever is pivotably supported to the body at a predetermined angle by a common shaft.

* * * * *